United States Patent
Kubo et al.

(10) Patent No.: US 10,734,034 B2
(45) Date of Patent: Aug. 4, 2020

(54) DISC STORAGE DEVICE AND DISC ARCHIVE DEVICE

(71) Applicant: SONY SEMICONDUCTOR SOLUTIONS CORPORATION, Kanagawa (JP)

(72) Inventors: Takeshi Kubo, Kanagawa (JP); Naofumi Goto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/482,218

(22) PCT Filed: Jan. 11, 2018

(86) PCT No.: PCT/JP2018/000401
§ 371 (c)(1),
(2) Date: Jul. 30, 2019

(87) PCT Pub. No.: WO2018/159107
PCT Pub. Date: Sep. 7, 2018

(65) Prior Publication Data
US 2020/0043528 A1    Feb. 6, 2020

(30) Foreign Application Priority Data
Feb. 28, 2017    (JP) .................. 2017-035678

(51) Int. Cl.
*G11B 33/04*    (2006.01)
*G11B 33/00*    (2006.01)
(Continued)

(52) U.S. Cl.
CPC ........ *G11B 33/0477* (2013.01); *G11B 33/005* (2013.01); *G11B 33/022* (2013.01); *G11B 33/12* (2013.01)

(58) Field of Classification Search
CPC . G11B 17/0288; G11B 17/041; G11B 17/221; G11B 17/226; G11B 17/30;
(Continued)

(56) References Cited

U.S. PATENT DOCUMENTS 2,868,360 A * 1/1959 Donkin .................. B65D 25/04
206/3
4,335,816 A * 6/1982 Rager ....................... E05B 5/00
206/1.5
(Continued)

FOREIGN PATENT DOCUMENTS

CN    104205220 A    12/2014
EP    2833359 A1    2/2015
(Continued)

OTHER PUBLICATIONS

International Search Report and Written Opinion of PCT Application No. PCT/JP2018/000401, dated Mar. 13, 2018, 08 pages of ISRWO.

*Primary Examiner* — Brian E Miller
(74) *Attorney, Agent, or Firm* — Chip Law Group

(57) ABSTRACT

Provided is a disc storage device including a casing capable of storing a stacked body including one or a plurality of disc recording media and a spacer interposed between the disc recording media and an inner surface of a bottom plate, a position regulating unit that regulates a storage position of the stacked body inside the casing, and a plurality of through holes formed in an area of the bottom plate of the casing where the spacer is provided, in which the spacer is adsorbed to tips of pins to be inserted through the through holes.

6 Claims, 28 Drawing Sheets

(51) Int. Cl.
*G11B 33/02* (2006.01)
*G11B 33/12* (2006.01)

(58) Field of Classification Search
CPC ..... G11B 23/023; G11B 23/03; G11B 23/323; G11B 33/12; G11B 17/056
See application file for complete search history.

(56) References Cited

U.S. PATENT DOCUMENTS

| | | | | |
|---|---|---|---|---|
| 4,655,344 A | * | 4/1987 | Ackeret | G11B 33/0416 206/308.1 |
| 5,235,474 A | * | 8/1993 | Searle | G11B 15/6815 360/71 |
| 5,415,283 A | * | 5/1995 | Kim | G11B 33/0405 206/308.3 |
| 5,684,654 A | * | 11/1997 | Searle | G11B 15/6815 360/92.1 |
| 5,707,124 A | * | 1/1998 | Johnson | A47B 81/068 206/308.1 |
| 5,709,300 A | * | 1/1998 | Bolognia | G11B 33/0427 206/308.1 |
| 5,816,393 A | * | 10/1998 | Kim | G11B 33/0483 206/307.1 |
| 5,940,243 A | * | 8/1999 | Kanetsuku | G11B 17/24 360/92.1 |
| 5,943,305 A | * | 8/1999 | Fitzgerald | G11B 17/225 360/98.06 |
| 6,034,928 A | * | 3/2000 | Inoue | G11B 15/68 360/92.1 |
| 6,386,361 B1 | * | 5/2002 | Ting | G11B 33/0427 206/308.1 |
| 6,580,582 B1 | * | 6/2003 | Caverly | G11B 15/68 360/92.1 |
| 7,292,405 B2 | * | 11/2007 | Brace | G11B 15/6825 360/92.1 |
| 8,749,913 B2 | * | 6/2014 | Plutt | G11B 17/225 360/92.1 |
| 9,251,842 B1 | * | 2/2016 | Ehlen | G11B 17/225 |
| 9,761,265 B2 | * | 9/2017 | Chihara | G11B 17/223 |
| 9,959,901 B1 | * | 5/2018 | Miyashita | G11B 20/1816 |
| 9,990,954 B2 | * | 6/2018 | Sekine | G11B 17/221 |
| 10,283,158 B2 | * | 5/2019 | Kosaka | G11B 23/03 |
| 2003/0217939 A1 | * | 11/2003 | Hegarty | G11B 33/045 206/308.1 |
| 2005/0161367 A1 | * | 7/2005 | Matsutori | H01L 21/67369 206/711 |
| 2006/0044686 A1 | * | 3/2006 | Oishi | G11B 23/0303 360/133 |
| 2007/0102311 A1 | * | 5/2007 | Kirtz | G11B 33/0427 206/308.1 |
| 2011/0315566 A1 | * | 12/2011 | Boynton | A45C 11/16 206/6.1 |
| 2015/0074692 A1 | | 3/2015 | Yoshida et al. | |

FOREIGN PATENT DOCUMENTS

| | | |
|---|---|---|
| JP | 2014-013639 A | 1/2014 |
| JP | 2015-111490 A | 6/2015 |
| JP | 2016-091577 A | 5/2016 |
| WO | 2013/145042 A1 | 10/2013 |
| WO | 2016/208117 A1 | 12/2016 |

* cited by examiner

DISC STORAGE DEVICE AND DISC ARCHIVE DEVICE

CROSS REFERENCE TO RELATED APPLICATIONS

This application is a U.S. National Phase of International Patent Application No. PCT/JP2018/000401 filed on Jan. 11, 2018, which claims priority benefit of Japanese Patent Application No. JP 2017-035678 filed in the Japan Patent Office on Feb. 28, 2017. Each of the above-referenced applications is hereby incorporated herein by reference in its entirety.

TECHNICAL FIELD

The present technology relates to a disc storage device and a disc archive device in each of which a large-capacity optical disc is used.

BACKGROUND ART

An archive device using a large-capacity optical disc (hereinafter referred to as a "disc") is practically applied. As a memory device in a data center, there is a memory device using a magnetic tape as a medium. Compared to the magnetic tape, a disc is suitable for cold archive intended for long-term storage. For example, Patent Document 1 below discloses an archive device capable of storing 12 discs in a magazine, and the discs can be handled per magazine.

Since the 12 discs are stored in one magazine as disclosed in Patent Document 1, there are advantages that: the number of discs accessible at one time is more increased than in a case of loading discs one by one in a drive; and larger data can be recorded or reproduced at one time. However, it is desired that a larger amount of data is recorded or reproduced in every data center.

The applicant of the present application has previously proposed a disc media storage device (hereinafter referred to as a disc tray as appropriate) that stores a larger number of discs in a casing. This disc tray can store 64 discs (4 rows×16 discs=) in a box-shaped synthetic resin casing having an open upper surface. A large number of the disc trays are stored in a storage rack, and a tray conveyance robot picks out a predetermined disc tray from the storage rack and conveys the disc tray to a disc drive, and the disc drive executes data recording/reproducing for a plurality of discs at the same time.

CITATION LIST

Patent Document

Patent Document 1: Japanese Patent Application Laid-Open No. 2014-13639

SUMMARY OF THE INVENTION

Problems to be Solved by the Invention

Thus, in a library system that manages a plurality of discs by stacking the discs in a disc tray by own weight, a resinous spacer is arranged as a dust cover and a receiver of the disc stack between a lowermost disc and a bottom surface of the tray. When a desired disc is picked out from the disc tray, the disc is picked out by pushing up the resin spacer with a pushing pin called a pusher so as not to damage the disc.

The picked-out disc is conveyed to the vicinity of a disc drive and inserted into the disc drive, and recording and reproducing are performed. In the disc tray, for example, 16 discs are fed in each row, and the discs may be electrically charged in processes of conveyance of the 16 discs and recording/reproducing in the disc drive. When the electrically-charged discs are put back to the disc tray, the resin spacer may be electrically charged as a result, and the resin spacer may adhere to a disc due to static electricity. Additionally, for example, the weight of the 16 discs is constantly applied, and there is a possibility that adhesion of a contact surface may also occur. Conventionally, force to separate the resin spacer from the discs is dependent only on the own weight of the spacer.

When the resin spacer adheres to the disc picked out from the disc tray, it is determined that the correct number of discs is not picked out, the picked-out discs are returned to the disc tray, and the disc pick-out operation is retried. Therefore, there is a problem that performance of the system is degraded.

Therefore, the present technology is directed to providing a disc storage device and a disc archive device in which discs can be stably picked out from a disc tray.

Solutions to Problems

The present technology is a disc storage device including:
a casing capable of storing a stacked body including one or a plurality of disc recording media and a spacer interposed between the disc recording media and an inner surface of a bottom plate;
a position regulating unit that regulates a storage position of the stacked body inside the casing; and
a plurality of through holes formed in an area of the bottom plate of the casing where the space is provided, in which the spacer is adsorbed to tips of pins to be inserted through the through holes.

Additionally, the present technology is a disc archive device including: a disc storage device; a disc conveyance unit positioned above the disc storage device; and a disc pushing unit positioned below the disc storage device;

in which the disc storage device includes: a casing capable of storing a stacked body including one or a plurality of disc recording media and a spacer interposed between the disc recording media and an inner surface of a bottom plate; a position regulating unit that regulates a storage position of the stacked body inside the casing; and a plurality of through holes formed in an area of the bottom plate of the casing where the spacer is provided, the disc conveyance unit includes: a support position inserted into a central opening of the stacked body; and a claw that is provided at a peripheral surface on a tip side of the support position and is openable/closable, the disc recording medium being locked in a state in which the claw is opened, the disc pushing unit includes: a plurality of pins that is inserted into the casing through the through holes and pushes up the spacer; and an actuator that moves up and down the pins, and the pins push up the stacked body while using the support portion and a center pole as guides, and disc recording media located on an upper side than a position of the claw are made to be positioned outside the casing.

Effects of the Invention

According to at least one embodiment, the desired number of discs can be picked out from the disc tray. Additionally, it is possible to prevent the spacer from adhering to a disc and being picked out together with the disc at the time of picking out the disc. Note that the effects recited herein are not limited and may be any effect disclosed in the present technology or may be an effect different therefrom. Also, the content of the present technology should not be understood in a manner limited by the effects exemplified in the following description.

MODE FOR CARRYING OUT THE INVENTION

Figure 1:
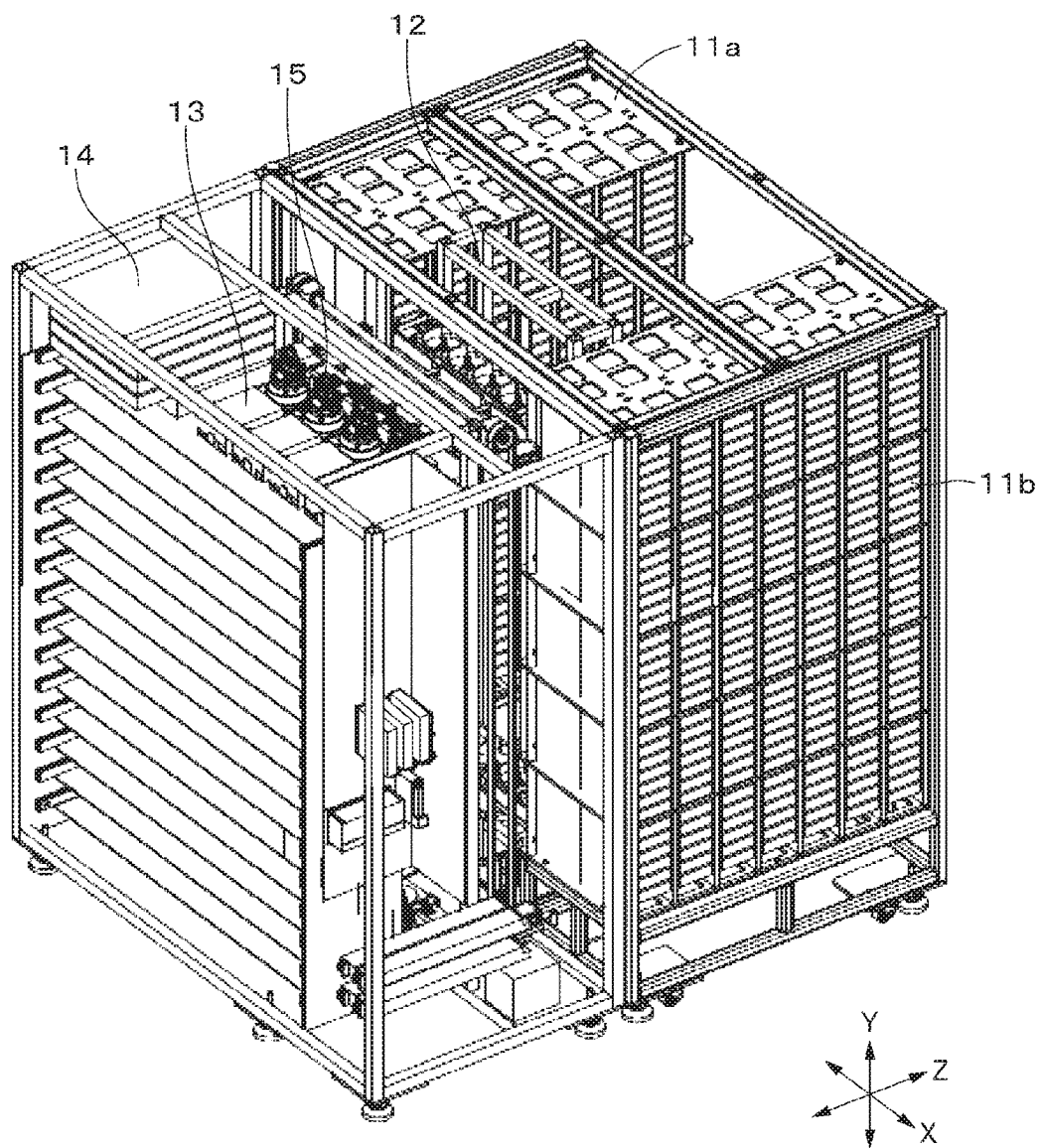
FIG. 1 is a perspective view illustrating an entire disc archive device.

An embodiment described below is a preferable specific example of the present technology and includes various limitations that are technically preferable. However, the scope of the present technology is not limited to the embodiment unless there is a description specifically limiting the present technology in the following description.

Note that the present technology will be described in the following order.

1. Embodiment

2. Modified Examples

1. Embodiment

[Disc Archive Device]

A disc archive device to which the present technology can be applied will be described. In this device, a large capacity optical disc is used as a disc. For example, a high-density optical disc such as BLU-RAY DISC® (BD) can be used as the disc. The BD is a high-density optical disc having a recording capacity of about 25 GB in a case of a single-sided/single-layer type, and about 50 GB in a case of a single-sided/single-layer type. According to the BD standards, a light source wavelength is 405 nm and a numerical aperture (NA) of an objective lens is large like 0.85 in order to reduce a beam spot diameter. Furthermore, in recent years, a BDXL® is practically applied, in which the BDXL® achieves a high density in a line density direction by shortening a channel bit length, namely, a mark length of the BLU-RAY DISC® (BD), and achieves a large capacity such as 100 GB in a case of a triple-layer type, and 128 GB in a case of a quadruple-layer type. Moreover, proposed is a disc that adopts a method of recording data in both of a groove track and a land track (referred to land/groove recording method as appropriate) in order to further increase a recording capacity. In this case, the larger capacity can be achieved.

[Outline of Disc Archive Device]

The disc archive device according to an embodiment roughly executes processing as follows.

1. A large number of disc trays are preliminarily stored by an operator in disc tray storage shelves (hereinafter referred to as a disc tray rack).

2. A tray conveyance device (hereinafter referred to as a tray conveyance robot) travels in the vicinity of the disc tray rack to find a target disc tray, picks out the disc tray from the disc tray rack, and the tray conveyance robot holds the disc tray.

3. The disc tray held by the tray conveyance robot is carried to a turntable, and the disc tray is put on the turntable. Two disc trays can be set on the turntable.

4. A disc conveyance unit (referred to as a disc conveyance picker) picks out the desired number of discs (for example, the arbitrary number of discs from one disc or more to 16 discs or less) from one disc tray on the turntable. Conventionally, when disc(s) is (are) thus picked out, there is a possibility that a spacer provided in a disc tray adheres to the disc(s) and picked out together with the disc(s). The present technology can solve such an adhesion problem of the spacer as described later.

5. The disc conveyance picker conveys the desired number of discs to the vicinity of a disc drive. The discs are set one by one on a disc placement surface of the disc drive (hereinafter referred to as a drive tray). In this case, disc setting is started from a lowermost disc of the discs held by the disc conveyance picker. A disc loading device (hereinafter referred to as a picker pusher) is moved up and down through a central opening of the drive tray, picks out one piece of disc from among the discs held by the disc conveyance picker, and sets the disc on the disc tray.

6. The disc tray is inserted into a main body of the disc drive. The disc drive performs access operation (recording or reproducing operation) for the set disc. When the access operation is completed, the disc tray is ejected from the main body.

7. The disc conveyance picker is moved above the disc tray. The disc on the disc tray is loaded onto the disc conveyance picker by the picker pusher.

8. The disc conveyance picker conveys the loaded disc to the disc tray on the turntable, and stores the disc in the disc tray.

9. The turntable is rotated and the tray conveyance robot places the disc tray.

10. The tray conveyance robot stores the disc tray in the original position of the disc tray rack.

[Entire Configuration of Archive Device]

Figure 2:
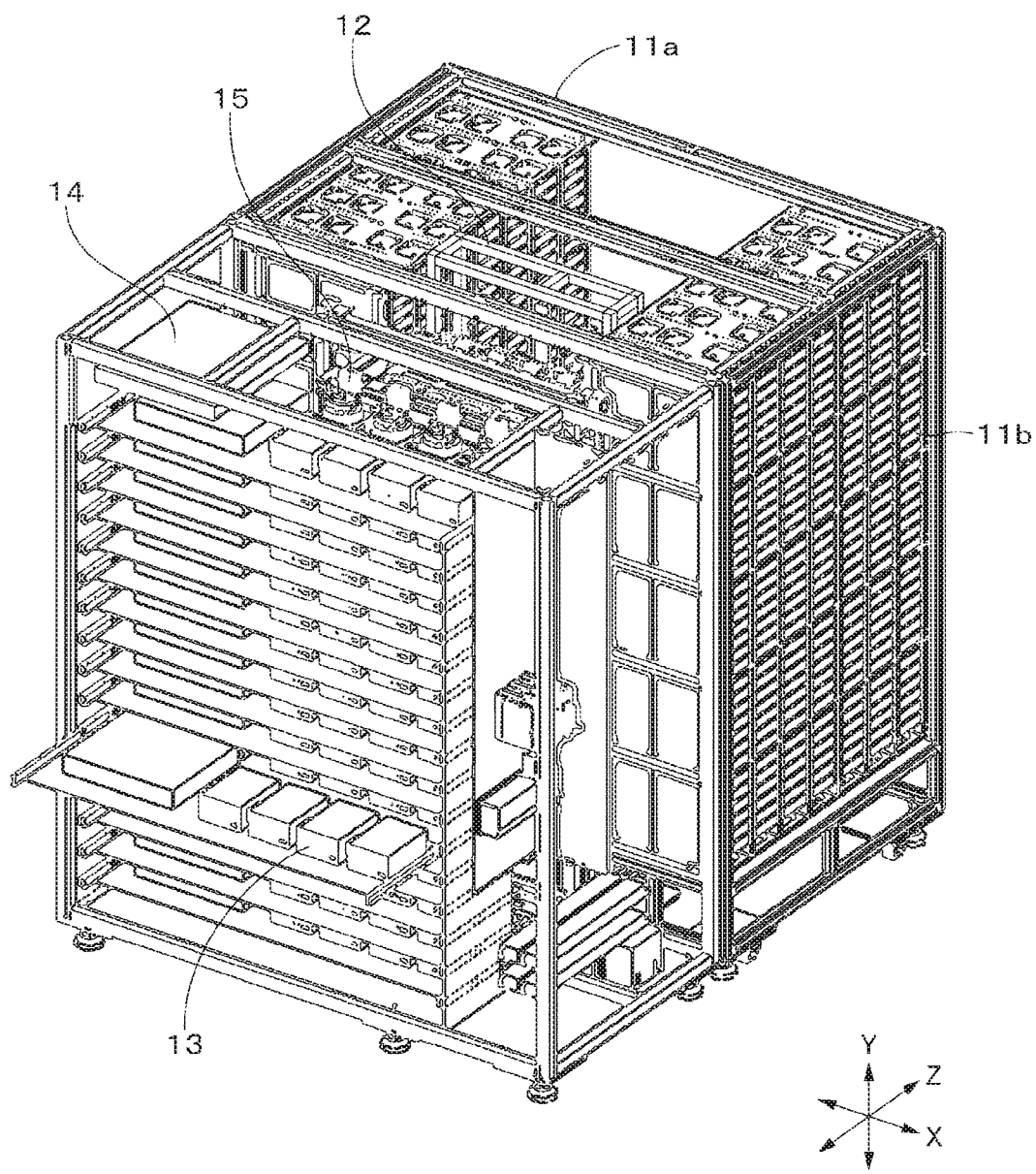
FIG. 2 is a perspective view illustrating the entire disc archive device.
Figure 3:
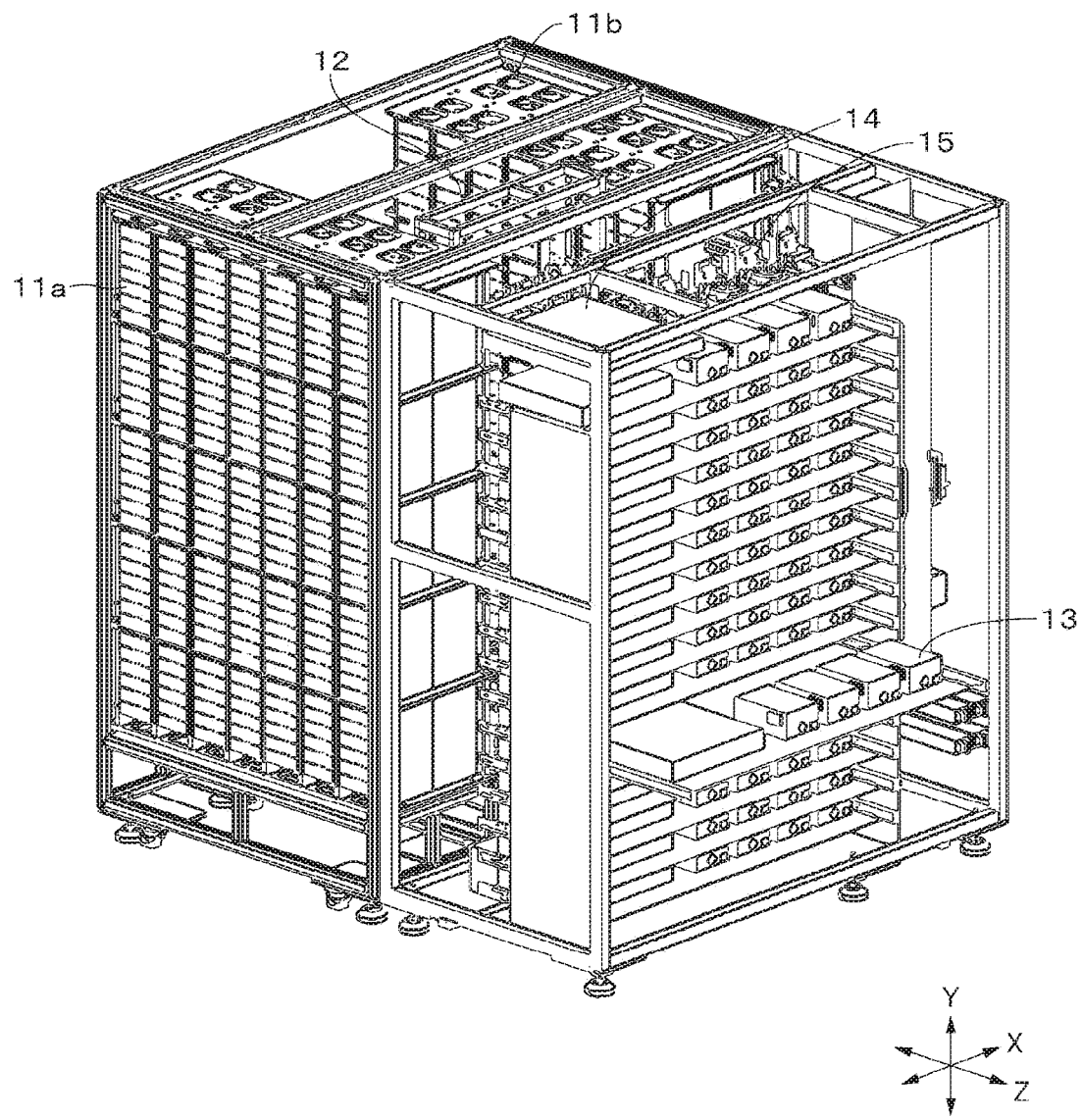
FIG. 3 is a perspective view illustrating the entire disc archive device.

FIGS. 1, 2, and 3 are perspective views of an external appearance of an entire system of the disc archive device to which the present technology can be applied. The system mainly includes tray racks 11a and 11b, a tray conveyance robot 12, a disc drive 13, a controller the controls the entire system, an electric circuit unit 14 including a power supply circuit and the like, a disc conveyance picker 15, and a turntable 16. A configuration including one tray rack 11 is a minimum configuration, and the number of tray racks 11 can be increased by connecting a tray rack 11 in a Z direction.

A space in which the tray conveyance robot 12 travels is formed between the tray racks 11a and 11b facing each other. The tray conveyance robot 12 is guided by, for example, a trolley line in a lower portion or a rail in the lower portion, and is made to travel by a drive source such as an electric motor. The tray conveyance robot 12 can be stopped at a desired position by a position sensor. Furthermore, a bar code indicated on a surface of a casing of each disc tray is read by a bar code reader included in the tray conveyance robot 12, and a designated disc tray is taken out from the tray rack 11a or 11b and conveyed to the vicinity of the disc conveyance picker 15.

Figure 4:
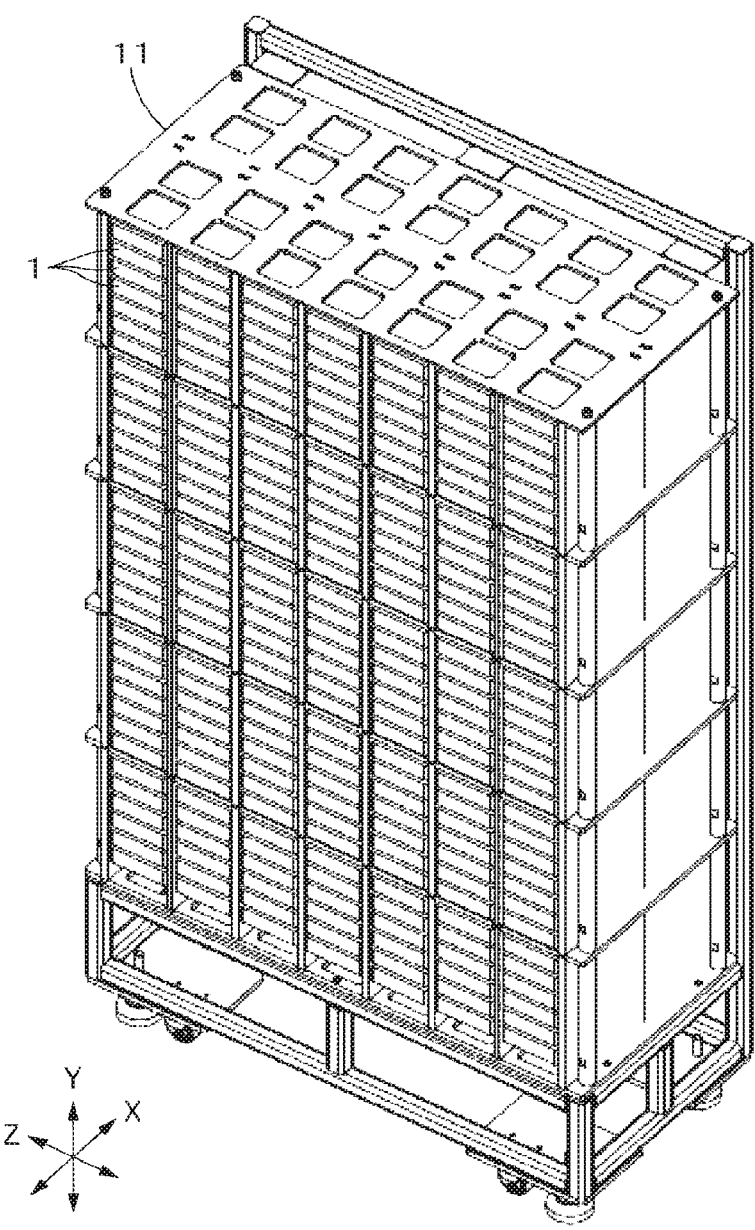
FIG. 4 is a perspective view used to describe a disc tray rack.

For example, as illustrated in FIG. 4, the disc tray rack 11 includes a plurality of storage units partitioned by five shelves, and disc trays are loaded in each storage unit. On a lowermost shelf, six disc tray storage units are provided in a Y direction, and seven groups each including the six storage units are arrayed in the Z direction. In other words, the storage units capable of loading 42 disc trays at maximum are provided. Each of other shelves is provided with seven disc tray storage units, seven groups each including seven storage units are arrayed in the Z direction, and the storage units capable of loading 49 disc trays at maximum are provided. Therefore, at maximum, 238 disc trays (=42+ 49×4) can be stored in one disc tray rack 11.

Each of the storage units of the tray rack 11 has openings in front and back thereof, and has a storage space slightly larger than each disc tray. The opening on an inner side (hereinafter referred to as "front side") of each storage unit is opened in order that each disc tray may be freely picked out by the tray conveyance robot, and a door covering this opening is provided on an outer side (hereinafter referred to as "back side") thereof. The conveyance robot is moved in the Z direction along a front surface of the tray rack 11 and picks out a target disc tray on the basis of identification information such as a bar code. Additionally, an operator can first set the disc trays in the storage units of the tray rack 11 from the opening on the back side of each storage unit by opening a door on a back side of the tray rack 11.

Note that, basically, a disc tray including media cannot be inserted/taken out the outside of the system after the disc trays are installed in the tray rack 11. However, in a case where an error occurs, in a case where a disc inside a library is brought out from an apparatus, in a case where it is attempted to execute offline management for a tray having low access frequency, or the like, it is desirable that the disc tray can be freely inserted into/taken out from the system. For this reason, a different tray rack dedicated to import/ export may be installed in a part of the library system so as to enable offline management for the disc trays storing the discs.

[Exemplary Disc Tray]

Figure 5A:
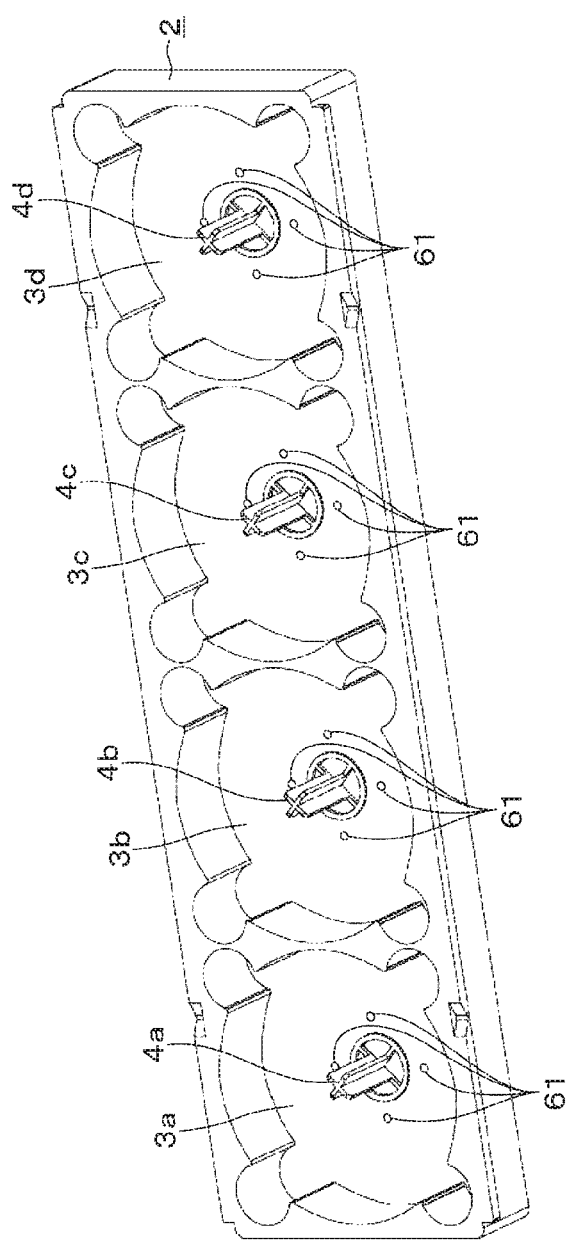
FIGS. 5A and 5B are perspective views used to describe a disc tray.
Figure 5B:
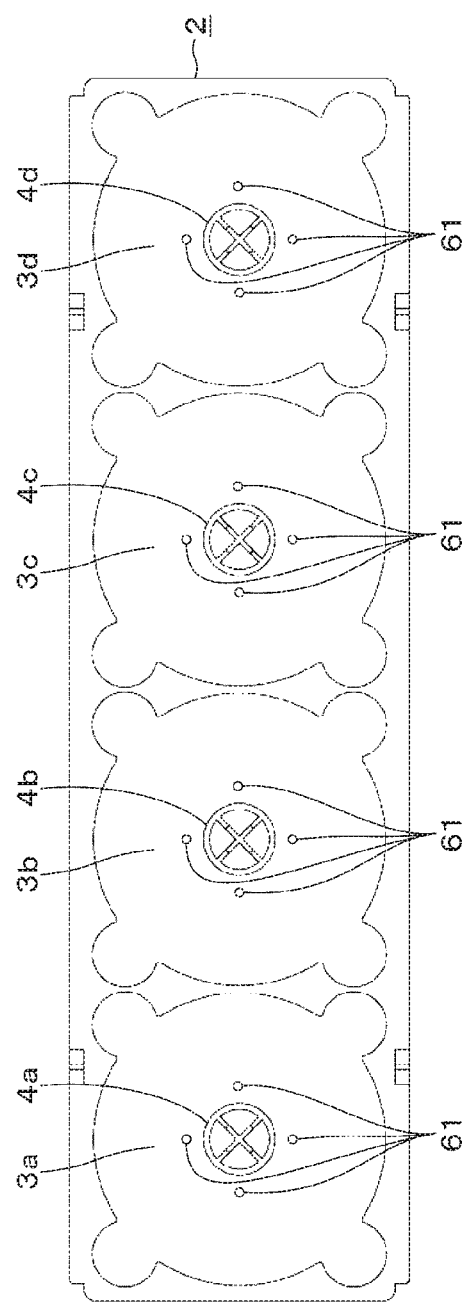

In a disc tray 1, four storage recesses 3a to 3d (referred to as storage recesses 3 in a case where there is no need to distinguish the individual storage recesses) are formed in a manner aligned in a box-shaped synthetic resin casing 2 having an open upper surface as illustrated in FIGS. 5A and 5B. Each of the storage recesses 3 is a recess having a shape substantially same as an outer shape of a disc, and center poles 4a to 4d (refereed to as center poles 4 in a case where there is no need to distinguish the individual center poles) that regulate storage positions inside the casing 2 are erected at centers of the respective storage recesses 3. In other words, N rows (e.g., N=4) of discs 5 are stored. Note that four through holes 61 penetrating a bottom plate of the casing 2 are formed around each center pole 4. Each of the through holes 61 is a hole into which a pin of a disc pushing unit described later is inserted.

Figure 6:
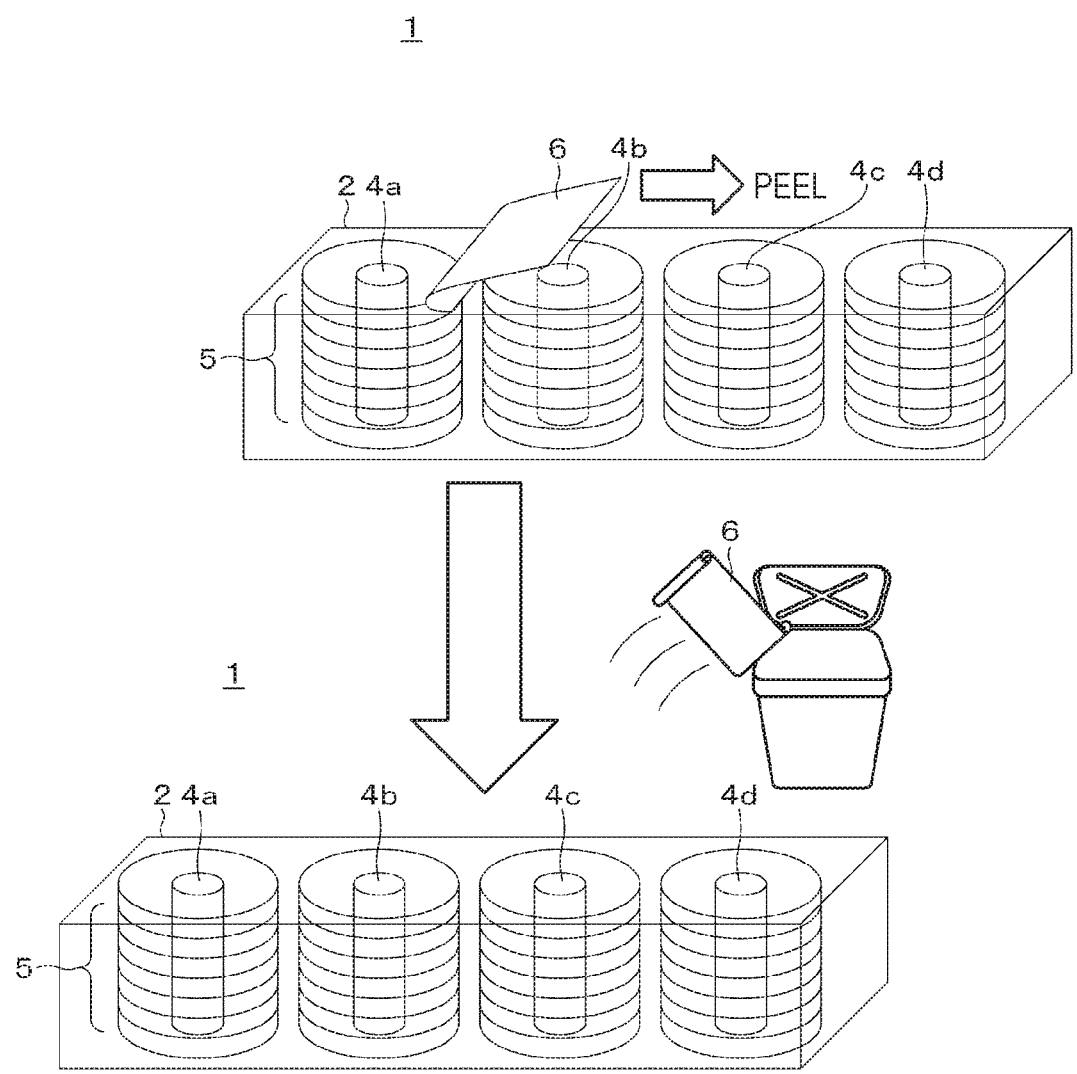
FIG. 6 is a perspective view used to describe the disc tray.

As illustrated in FIG. 6, M pieces of discs 5 (e.g., M=16) are stacked and stored in each storage recess 3 (in each row), and disc covers are arranged in an uppermost stage as described later. Each center pole 4 penetrates an opening at a center of the discs. Furthermore, after the discs 5 are stored, an upper opening of the casing 2 is covered with a transparent or translucent resin film 6. A disc storage container in which the discs are stored and sealed with the film 6 as described above will be referred to as the disc tray 1. However, the film 6 is peeled off from the casing 2 at the time of use, and discarded. When the opening is sealed with the film 6, it is possible to prevent dust from being attached to the discs 5 and guarantee that the discs are unused. Furthermore, in a case where the film 6 is replaced with a new film, security can be more enhanced if a trace of the replacement remains. Furthermore, after the film 6 is peeled off, the disc cover (not illustrated) is arranged in the uppermost layer of the stacked discs 5, and therefore, floating dust is prevented from being attached to the discs 5 used for data saving.

A disc cover is placed on the uppermost stage of the plurality of discs 5 stored in the disc tray 1 and dust is prevented from being attached to the discs 5. In a case where the disc trays 1 are stored in a shelf of the disc tray rack, there is a slight gap between an upper surface (opened surface) of a certain disc tray 1 and a bottom surface of another disc tray 1 located above the certain disc tray. In a case where the disc tray rack is subjected to large vibration like an earthquake, the discs may pop out from the disc tray 1 and fall off.

Figure 7A:
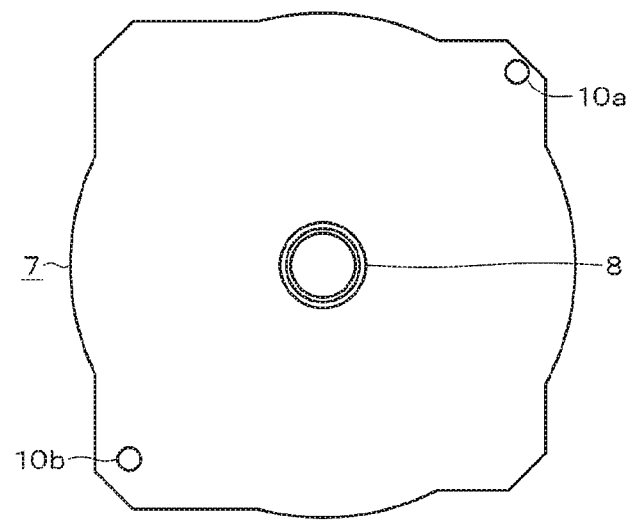
FIGS. 7A, 7B, and 7C are a plan view, a bottom view, and a perspective view of an exemplary disc cover.
Figure 7B:
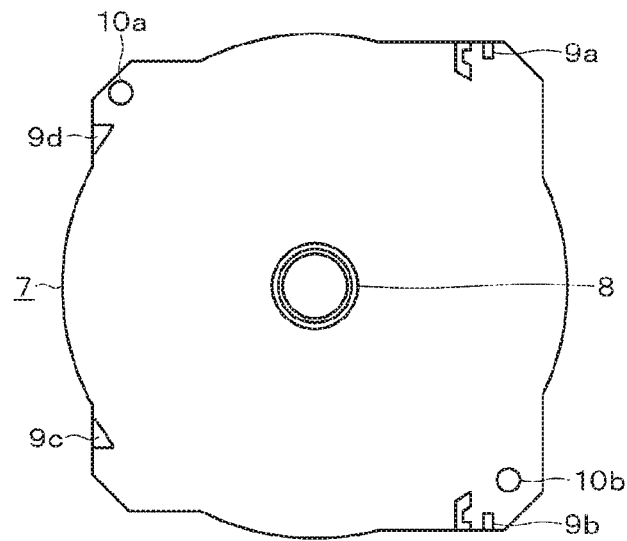
Figure 7C:
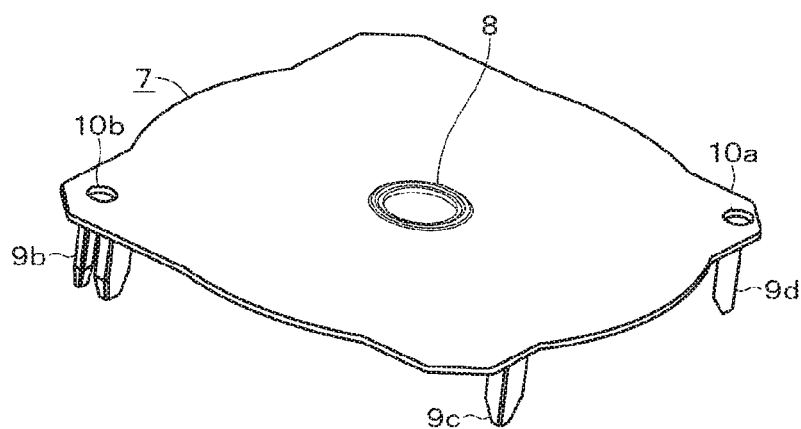

As an example, a disc cover 7 as illustrated in FIGS. 7A, 7B, and 7C is used. Each disc cover 7 includes: a central opening 8 that is formed on a main surface in a similar manner to each disc 5; leg portions 9a, 9b, 9c, and 9d (referred to as leg portions 9 in a case where there is no need to distinguish the individual leg portions) projecting from four corners on an outer side of a rear surface; and holes 10a and 10b formed at two places in a diagonal direction.

Figure 8:
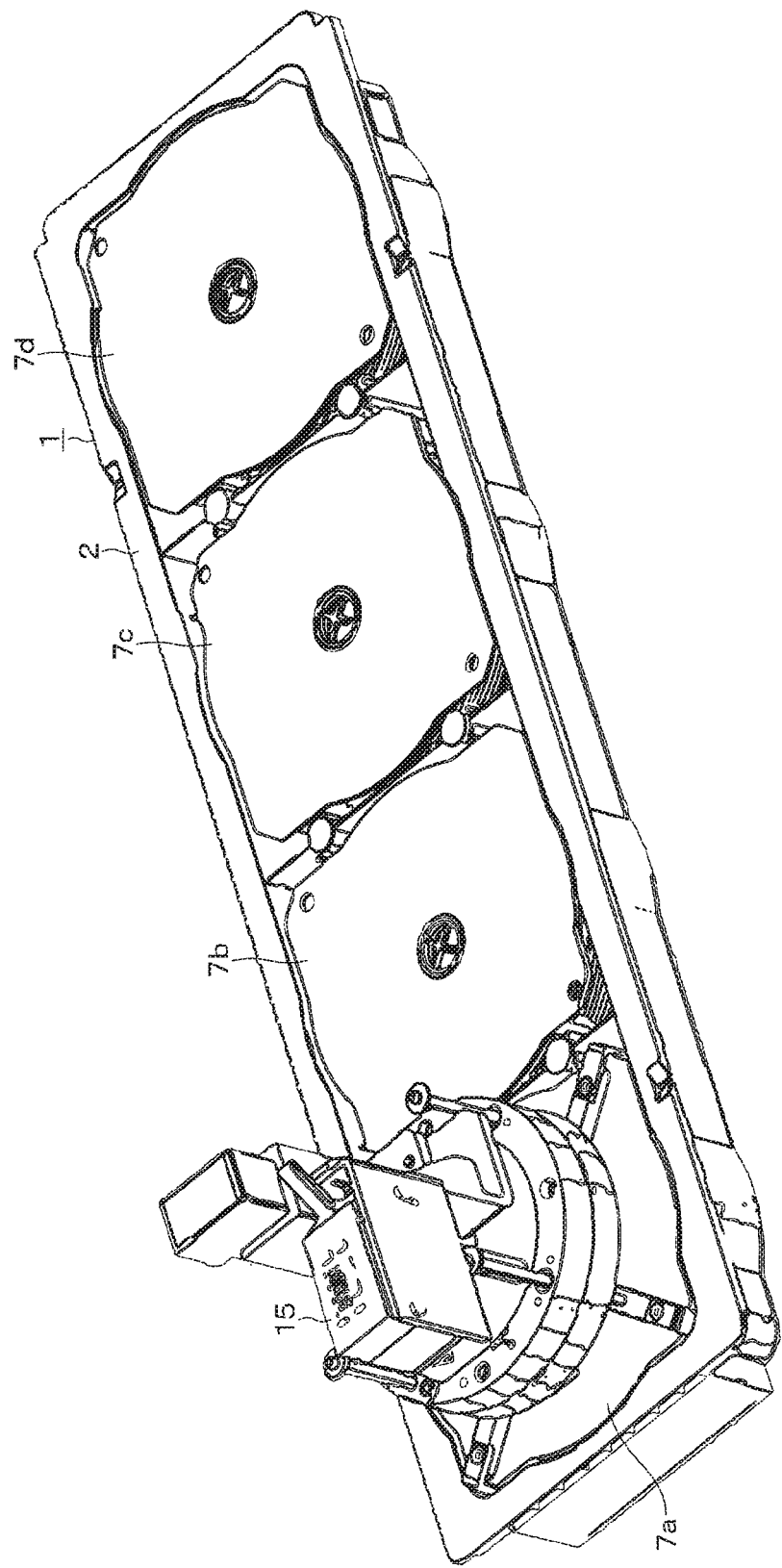
FIG. 8 is a perspective view of the disc tray in a state in which the disc cover is mounted.

As illustrated in FIG. 8, disc covers 7a, 7b, 7c, and 7d cover surfaces of the discs stacked in the storage recesses of the casing 2 of the disc tray 1. FIG. 8 illustrates a state in which the disc conveyance picker 15 is positioned above the stacked body of the discs in one of the rows. Processing in which the disc conveyance picker 15 picks out a disc 5 from the disc tray 1 will be described later. The above-described leg portions 9 are engaged with some portions, for example, protrusions formed in the respective storage recesses. In a case where the disc trays 1 are stored in the disc tray rack, a length of each leg portions 9 is slightly larger than a width of a gap generated between an upper surface of a disc tray 1 and a bottom surface of another disc tray 1 located above the disc tray 1. Since such leg portions 9 are included, even in a case where the disc covers 7a to 7d are vibrated, it is possible to prevent the disc covers 7a to 7d from falling off through the gap. Note that the discs can be prevented from falling off not only in a state in which the disc trays 1 are stored in the disc tray rack but also in a case where a disc tray 1 is conveyed by the tray conveyance robot.

Furthermore, a tapered pin (not illustrated) formed under an arm of the picker 15 is inserted into each of the holes 10a and 10b. Engagement of the holes 10a and 10b with the taper pins prevents the disc covers 7a to 7d from being rotated.

Figure 9:
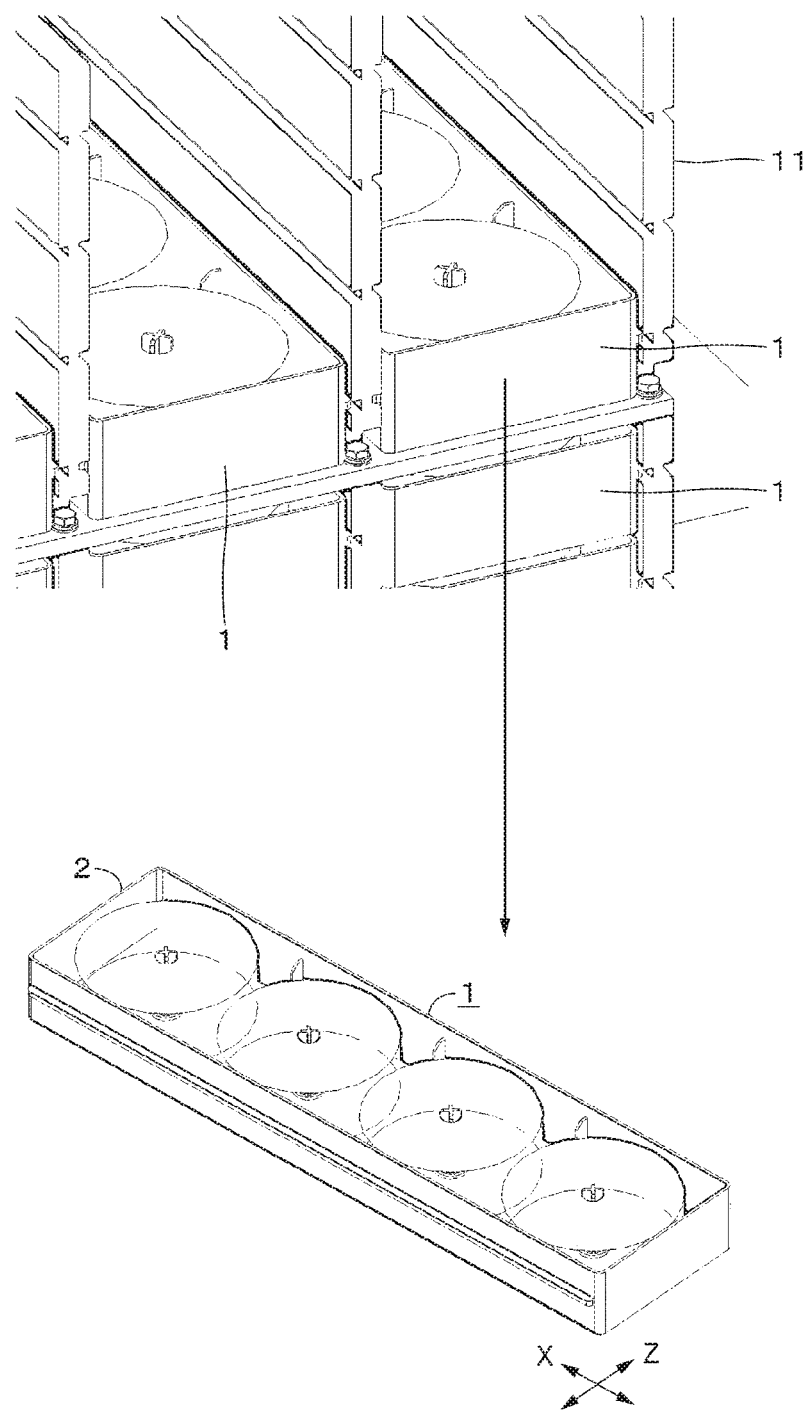
FIG. 9 is a perspective view used to describe the disc tray and the disc tray rack.

The disc trays 1 from each of which the films 6 has been peeled off are set in the respective storage units of the tray rack 11 as illustrated in FIG. 9. A length direction of the disc tray 1 is defined as the X direction, and a width direction thereof is defined as the Z direction. As described with reference to FIGS. 1 to 4, the tray rack 11 has a depth dimension slightly larger than the length of the disc tray 1, and has a width that can allow the seven disc trays 1 to be arrayed laterally and stored.

[Spacer]

Figure 10:
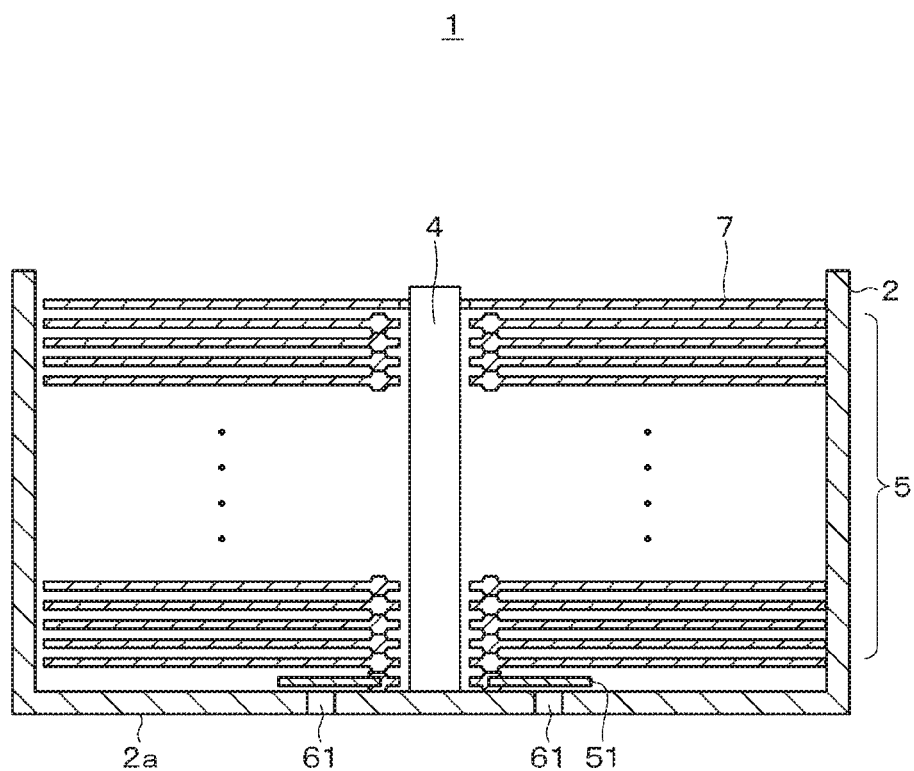
FIG. 10 is a cross-sectional view to describe a stacked body inside the disc tray.

FIG. 10 illustrates a cross section in a state in which the plurality of discs 5 is stored in each storage recesses 3 of the disc tray 1. However, only one row out of the four rows in the disc tray 1 is illustrated for simplification. The disc cover 7 is positioned on a top surface of the discs 5. Additionally, a spacer 51 is arranged on a lowermost surface of the discs 5. The center pole 4 passes through respective center holes of: the discs 5; the disc cover 7; and the spacer 51. Furthermore, a plurality of through holes 61 is formed in the bottom surface 2a of the casing 2.

Figure 11A:
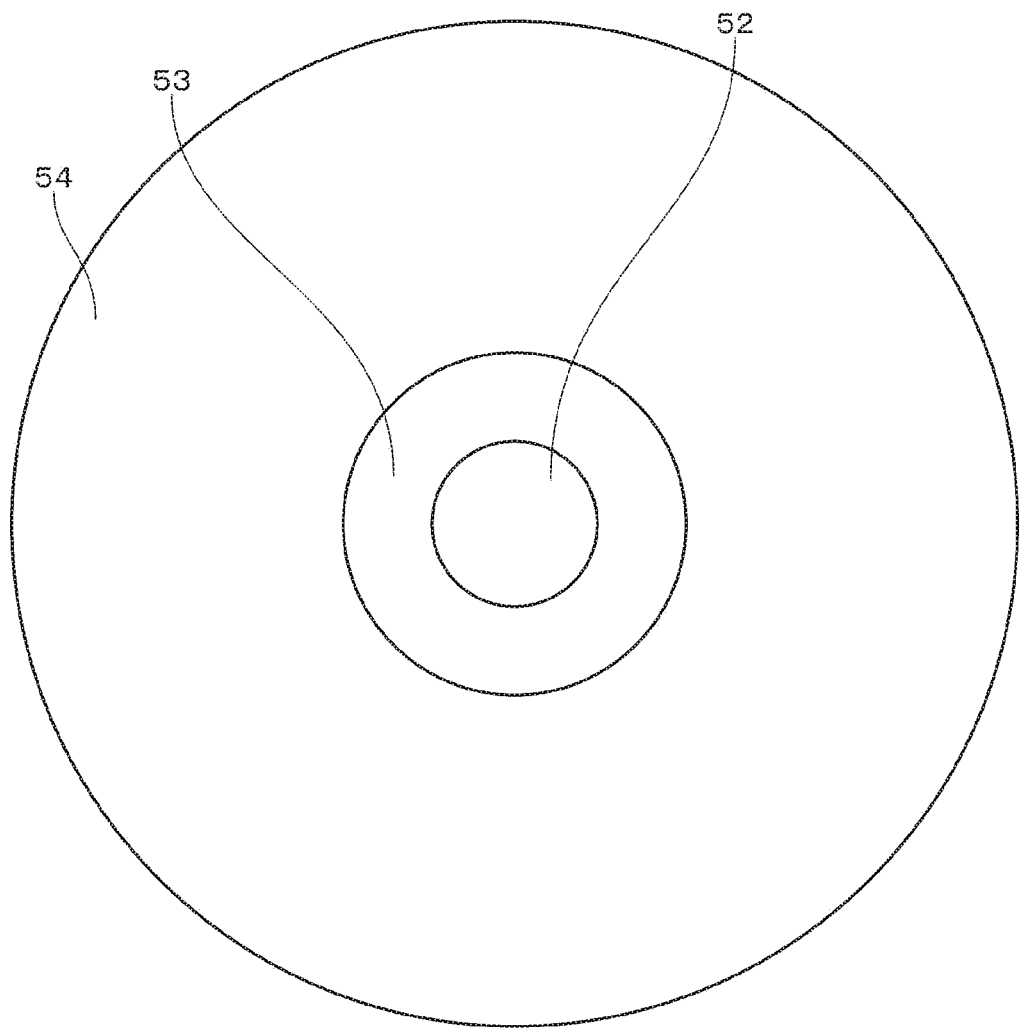
FIGS. 11A and 11B are a plan view and a cross-sectional view of a spacer.
Figure 11B:
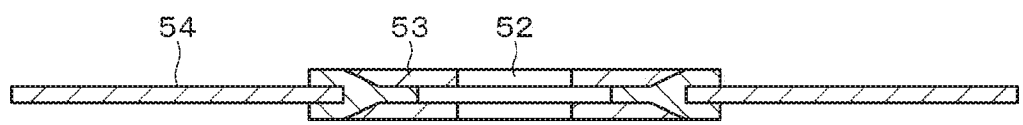

The spacer 51 is arranged on the bottom plate 2a of the casing 2 and serves as a dust cover and as a receiver of the stacked discs, and has a shape as illustrated in FIGS. 11A and 11B. A central opening 52 similar to that of the disc 5 is formed in a resin ring 53. A metal plate 54 is provided concentrically with the resin ring 53. The resin ring 53 and the metal plate 54 are formed by, for example, insert molding to produce the spacer 51.

A reason why the resin ring 53 is provided on the center side is to prevent the center pole 4 from being scraped at the time of contacting the center pole 4 of the casing 2. The resin ring 53 is, for example, polyacetal (POM), and the metal plate 54 is a magnetic metal such as stainless steel that sticks to a magnet. The spacer 51 has a diameter smaller than that of the disc 5. However, the diameter is set to a diameter of such an extent that the discs 5 can be supported by the spacer 51.

Figure 12A:
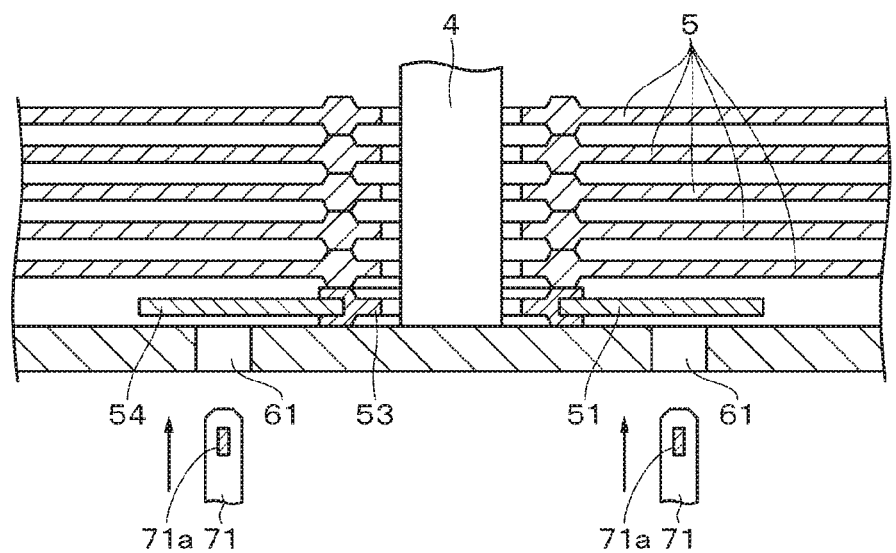
FIGS. 12A and 12B are cross-sectional views used to describe push-up action of pins.
Figure 12B:
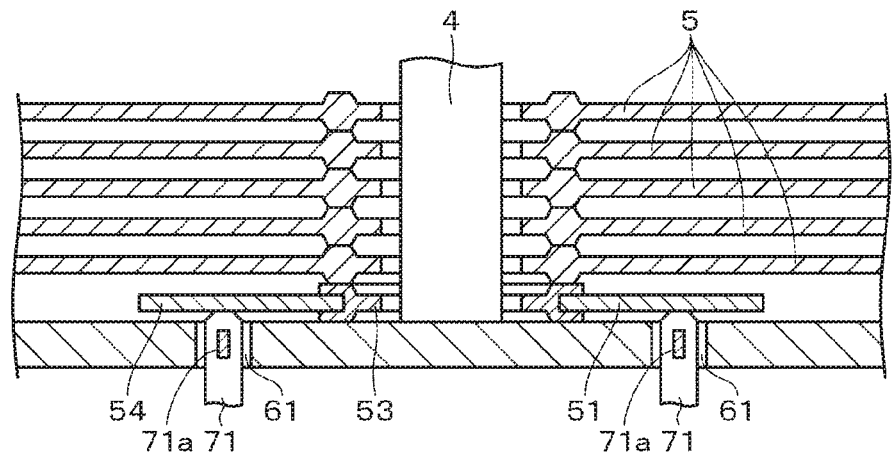

As illustrated in FIGS. 5A, 5B, and 10, the through holes 61 are formed at a plurality of place, for example, four places around the center pole 4 of the bottom plate 2a of the casing 2. FIGS. 12A and 12B schematically illustrate a state in which pins 71 of a disc push-out pusher push up, from the lower side, the spacer 51 through the through holes 61 inside the disc tray 1.

FIG. 12A illustrates a state in which the discs 5 and the spacer 51 are stacked and stored inside the disc tray 1. The pins 71 of the disc push-out pusher stand ready below the through holes 61 of the bottom plate 2a of the casing. At a tip of each of the pins 71, a magnet 71a is embedded. Note that an electromagnet may be used instead of the magnet. Furthermore, the spacer 51 may be adsorbed by sucking air.

When desired number of discs 5 is picked out from the disc tray 1, the pins 71 are inserted into the through holes 61 and further the tips of the pins 71 abut on the metal plate 54 of the spacer 51 as illustrated in FIG. 12B. Then, the pins 71 are further moved up, thereby pushing up the stacked discs 5 and the spacer 51.

When the discs 5 and the spacer 51 are moved up to a predetermined position, the upward movement is stopped. Then, the predetermined number of discs 5 are picked out from the disc tray 1 by the disc conveyance picker 15 and conveyed to the turntable 16. Note that a configuration and operation for the disc conveyance picker 15 to pick out the predetermined number of discs 5 from the disc tray 1 will be described later.

Conventionally, in a case of picking out discs 5 from a disc tray 1, there is a case where a spacer may adhere to a lowermost disc 5 by static electricity because the spacer includes a resin. In this case, the spacer is picked out from the disc tray 1 and conveyed together with the lowermost disc 5. In other words, the spacer is counted as one disc, and the number of discs to be picked out differs from the set number. In this case, a system determines that an error has occurred and retries the disc pick-out operation. Therefore, performance of the system is degraded.

In the embodiment of the present technology, the metal plate 54 of the spacer 51 sticks to the magnet 71a at the tip of each of the pins 71, and therefore, even though adhesion occurs in a contact surface between the disc 5 and the spacer 51, the spacer 51 can be separated by separation force stronger than the weight of the discs 5, the spacer 51 can be surely prevented from being picked out to the outside of the disc tray 1, and degradation of the performance can be prevented. Furthermore, the spacer 51 can be grounded by electrically grounding the pins 71 of the pusher to the ground, and static electricity of the discs 5 can be eliminated.

[Operation of Turntable]

Figure 13:
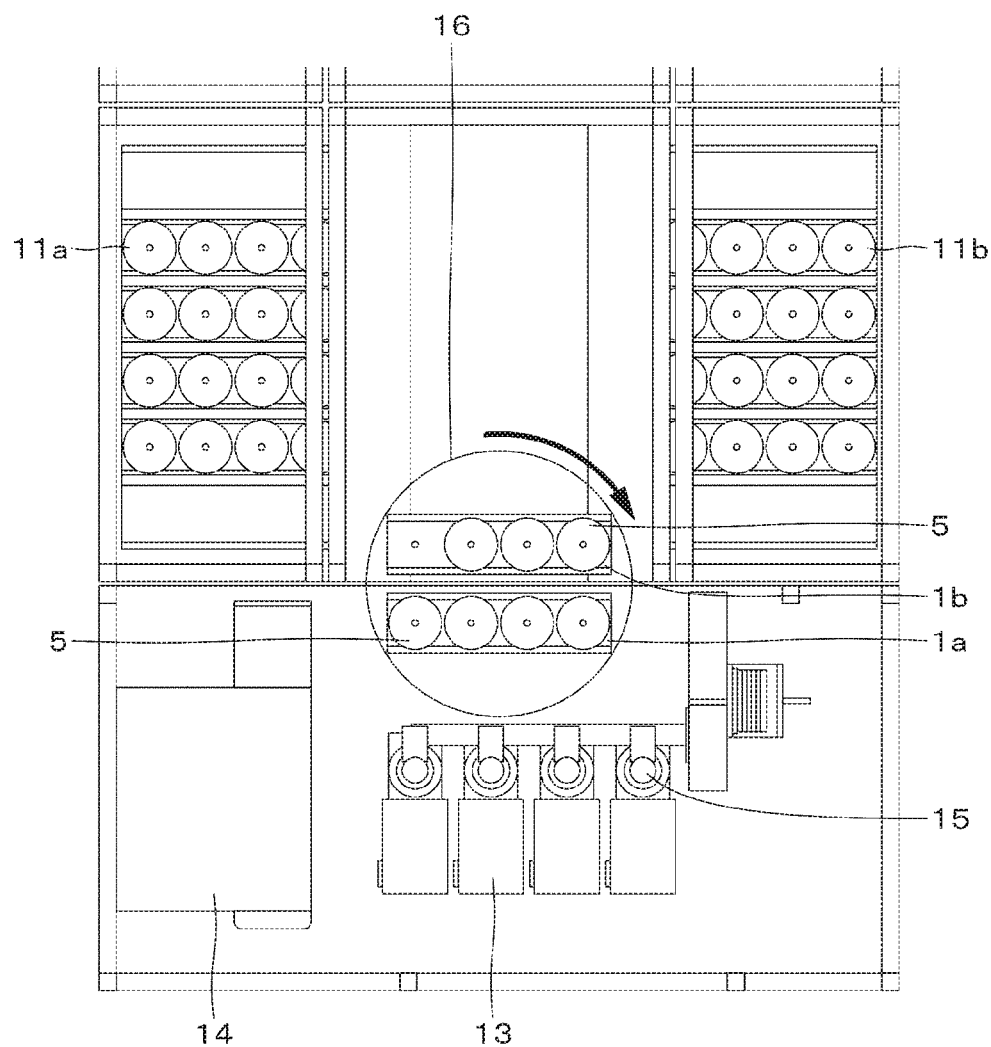
FIG. 13 is a plan view of the disc archive device.

The disc conveyance picker 15 and the turntable 16 are provided in order to deliver the discs between the tray conveyance robot 12 and the disc drive 13. FIG. 13 illustrates the turntable 16.

The turntable 16 is rotatable, and a first area and a second area provided to place two disc trays 1a and 1b are set on the turntable 16. The turntable is divided into two areas while setting a diameter of the turntable as a boundary, and the first area and the second area each having a semicircular shape are formed. The disc trays 1a and 1b can be placed in the first area and the second area, respectively.

The turntable 16 is half-rotated from a position illustrated in FIG. 13 so as to switch positions of the disc tray 1a and the disc tray 1b. Then, all of the discs 5 picked out by the disc conveyance picker 15 from a disc tray 1a located on a side closest to the disc drive 13 on the turntable 16.

The disc drive 13 is a device to execute information recording or reproducing for the discs 5. In the disc drive 13, the discs 5 are placed on a drive tray 13a ejected from the main body, the drive tray 13a is subsequently inserted into the main body, and the discs 5 are placed on the turntable rotated by a spindle motor. Then, data is recorded in or reproduced from the disc 5 by optical pickup. The disc drive 13 is formed by arranging, in the Y direction, 16 groups each including four drives arranged in the X direction. In other words, recording or reproducing can be simultaneously executed by the disc drive 13 for at maximum 64 discs 5 stored in one disc tray.

The disc conveyance picker 15 is moved to above the opening of the casing of the disc tray 1a, takes out the discs 5 stored in one disc tray 1a from the casing and holds the discs. The taken-out discs 5 are carried to a position immediately above the tray ejected from each of the four drives arranged in one stage of the disc drive 13. Since an interval between the four discs 5 in the disc tray 1a differs from an interval between drive shafts of the four drives, the disc conveyance picker 15 carries the discs 5 above tray while adjusting, for example, enlarging the interval between the taken-out four discs 5.

In a case of loading the discs 5 to the disc drive 13, drive trays 13a of four drives located at a lowermost position of the disc drive 13 are ejected, and the disc conveyance picker 15 carries the stacked discs 5 to immediately above the drive trays 13a. Then, one disc 5 located at a lowermost position among the discs held by the disc conveyance picker 15 is separated, and each separated disc 5 is placed on each of the drive trays 13a. The placed disc is loaded to each drive by each of the drive trays 13a being retracted to the inside.

Next, the disc conveyance picker 15 is moved upward (in the Y direction), and drive trays 13a are ejected from four drives located in a second lowest position from the bottom of the disc drive 13. Each disc 5 located in a second lowest position among the discs held by the disc conveyance picker 15 is separated and placed on each of the drive trays 13a. The placed disc is loaded to each drive by each of the drive trays 13a being retracted to the inside.

After that, similar operation is repeated, and an uppermost disc among the held discs are placed on each tray ejected from each of uppermost drives, and the placed disc is loaded to each drive by each of the trays being retracted to the inside. Thus, the discs 5 (4 rows×16 discs) stored in the one disc tray are loaded to the drives (4 rows×16 drives) of the disc drive 13, respectively.

When the processing including recording or reproducing for the discs picked out from a current disc tray 1a on the first area of the turntable 16 is finished under the control of a controller that controls the system, the turntable 16 is half-rotated, and processing including recording or reproducing is executed for a next disc tray 1b placed on the second area of the turntable 16.

Furthermore, during execution of the processing including recording or reproducing for the discs picked out from the current disc tray 1a on the first area of the turntable 16 under the control of the controller, the next disc tray 1b is selected by the tray conveyance robot 12, and the selected next disc tray 1b is placed on the second area of the turntable 16.

In other words, during execution of information recording or reproducing for the discs 5 of the disc tray 1a, the disc tray 1b to be used next is placed on the opposite surface of the turntable 16, and switching from the disc tray 1a to the disc tray 1b can be prepared. In other words, when the recording or reproducing for the discs 5 stored in the disc tray 1a is finished, the disc conveyance picker 15 unloads the discs 5 (4 rows×16 discs) from the disc drive 13. Contrary to the loading, unloading is started from the uppermost four disc drives 13. Then, the unloaded discs 5 are put back to the disc tray 1a, and further the disc tray 1a is placed on the turntable 16. Next, the turntable 16 is half-rotated, and the discs 5 in the disc tray 1b are loaded to the respective drives of the disc drive 13 by the disc conveyance picker 15.

[Disc Tray Switching Operation]

Figure 14:
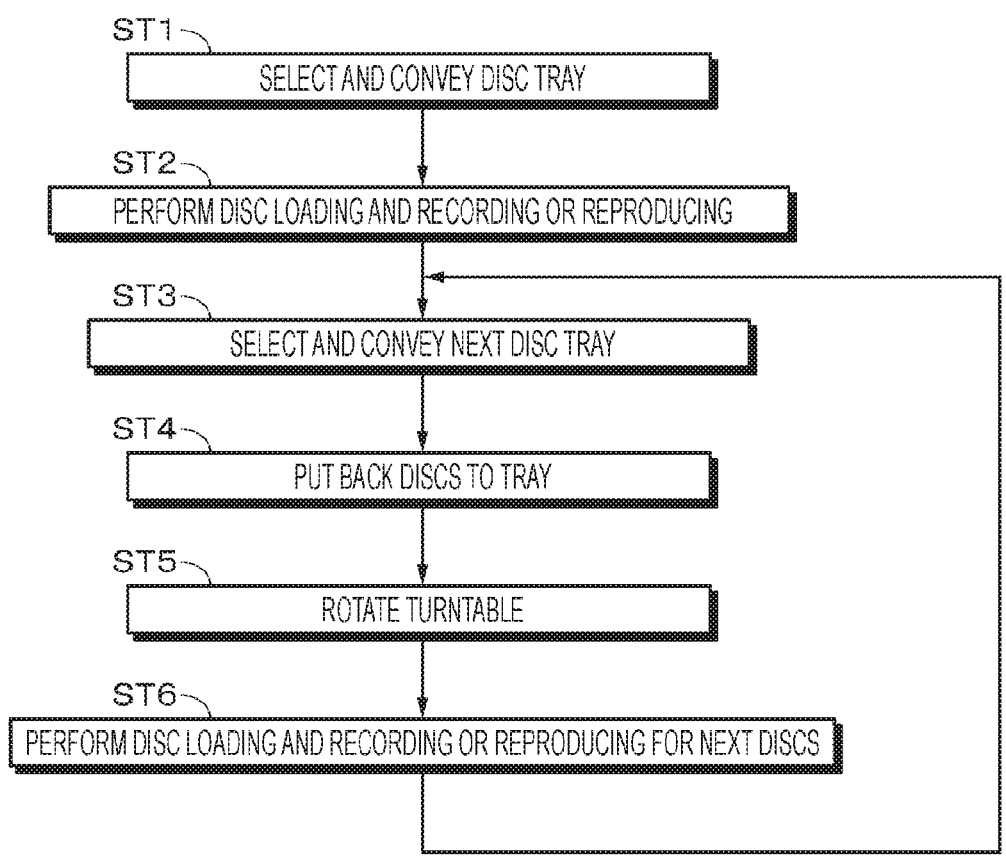
FIG. 14 is a flowchart illustrating a processing flow of the disc archive device.

Disc tray switching operation will be schematically described with reference to FIG. 14. In an initial state, assume that no disc tray is placed on the turntable 16.

Step ST1: A disc tray (for example, the disc tray 1a) is selected, and the selected disc tray is conveyed by the tray conveyance robot 12.

Step ST2: Discs 5 are loaded to the disc drive 13 by the disc conveyance picker 15. Then, the disc drive 13 executes recording or reproducing for the loaded discs 5.

Step ST3: While recording or reproducing is executed for the discs 5 in the first disc tray, a next disc tray (for example, the disc tray 1b) is selected, and the selected next disc tray is conveyed by the tray conveyance robot 12. The next disc tray is placed on the turntable 16.

Step ST4: When the recording or reproducing is finished, the discs 5 are put back to the first disc tray by the disc conveyance picker 15.

Step ST5: The turntable 16 is half-rotated, and the next disc tray is positioned in the vicinity of the disc conveyance picker 15.

Step ST6: Discs 5 in the next disc tray are loaded to the disc drive 13 by the disc conveyance picker 15. Then, the disc drive 13 executes recording or reproducing for the loaded discs 5. Then, the processing returns to step ST3 (furthermore, selection and conveyance of the next disc tray), and the above-described processing is repeated.

As described above, in the embodiment of the present technology, the next disc tray is placed on the turntable 16 while the recording or reproducing is executed for the discs 5 in the disc tray, and therefore, a time required for switching the disc trays is only to a time to half-rotate the turntable 16, and the switching time can be shortened. Additionally, since the discs (4 rows×16 discs) are stored in one disc tray, switching of a large number of discs can be executed in a short time.

[Tray Conveyance Robot]

In the state where the disc trays 1 are stored in the disc tray rack 11, an upper open space is restricted by a bottom surface of another disc tray 1 on an upper side, and therefore, the disc covers 7a to 7d can be prevented from popping out. However, when a disc tray 1 is picked out from the disc tray rack 11 and conveyed by the tray conveyance robot 12, the disc covers 7 and the discs 5 may pop out from the disc tray rack 11 because there is no upper restriction.

Figure 15:
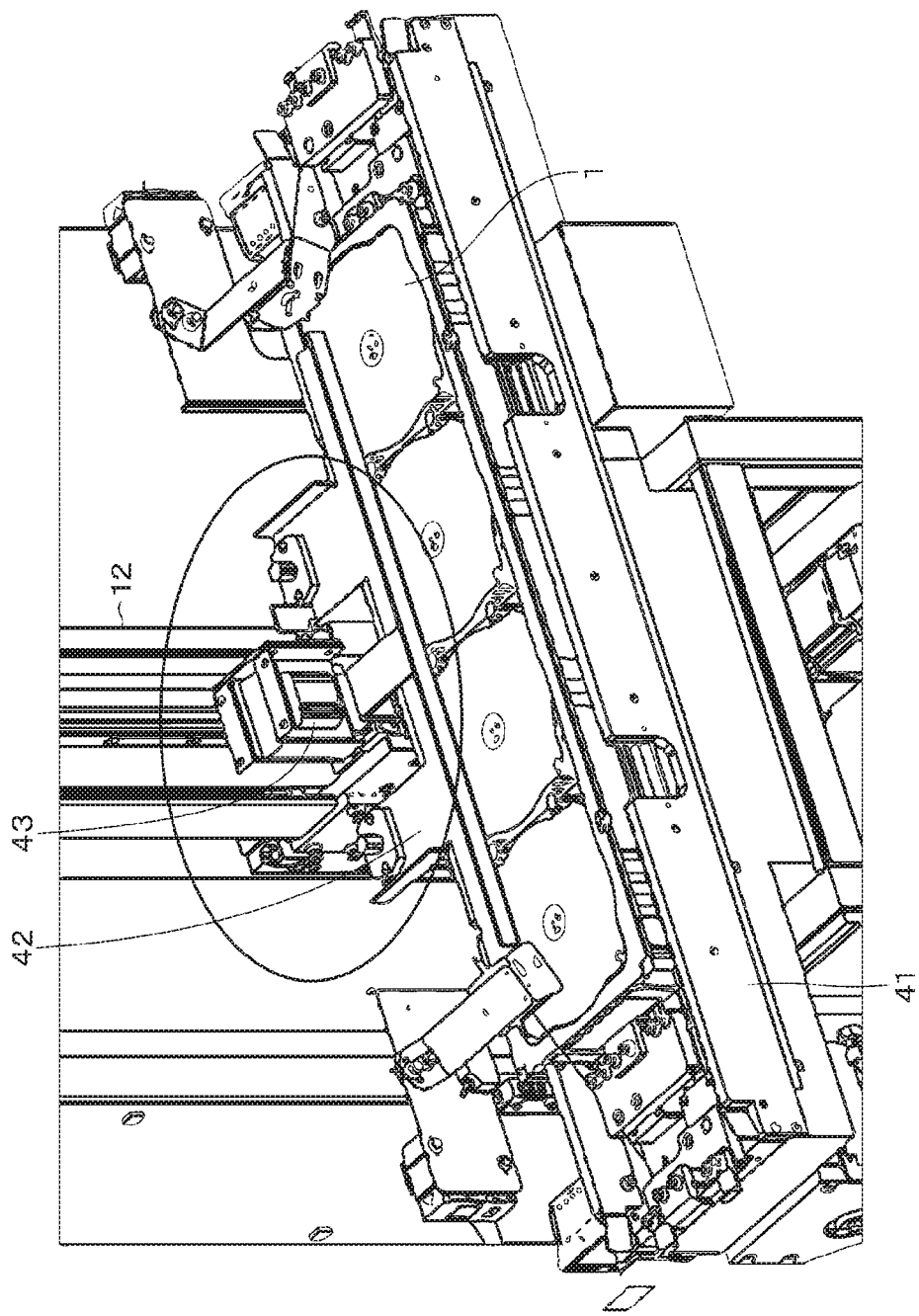
FIG. 15 is a perspective view used to describe a tray conveyance robot.
Figure 16:
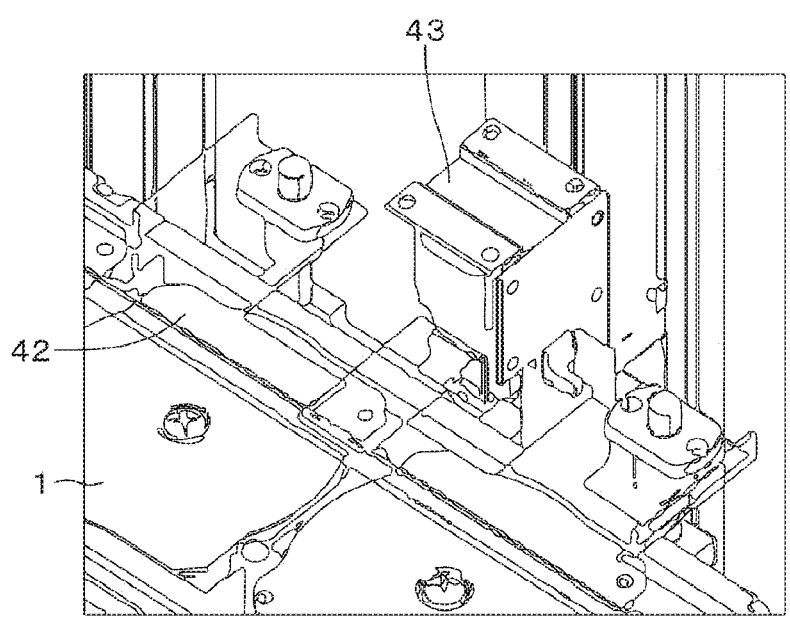
FIG. 16 is a perspective view illustrating a part of the tray conveyance robot.

As illustrated in FIG. 15, the tray conveyance robot 12 includes a disc tray holding unit 41 that holds the disc tray 1. A disc tray 1 inserted from the side opening is slid to and arranged in a predetermined position of the disc tray holding unit 41. A roof-like stopper 42 slightly shorter than a length in a longitudinal direction of the disc tray 1 is provided on an upper surface of the disc tray holding unit 41, and the stopper is provided in a manner movable up and down. As FIG. 16 illustrates an encircled portion of FIG. 22 in an enlarged manner, the stopper 42 is provided in a manner movable up and down by a solenoid 43. A gap is formed between a lower surface of the stopper 42 and the upper surface of the disc tray 1 at a position where the stopper 42 is moved down. The gap is shorter than the length of each of the leg portions 9.

Since the stopper 42 is provided, the disc covers 7 and the discs 5 can be prevented from popping out. Furthermore, the disc tray 1 can be also prevented from popping out from the disc tray holding unit 41. Note that a reason why the stopper 42 is moved up and down by the solenoid 43 is to prevent collision with the pins provided at the turntable 16 when the disc tray 1 is delivered to the turntable 16.

[Turntable Mechanism]

Figure 17:
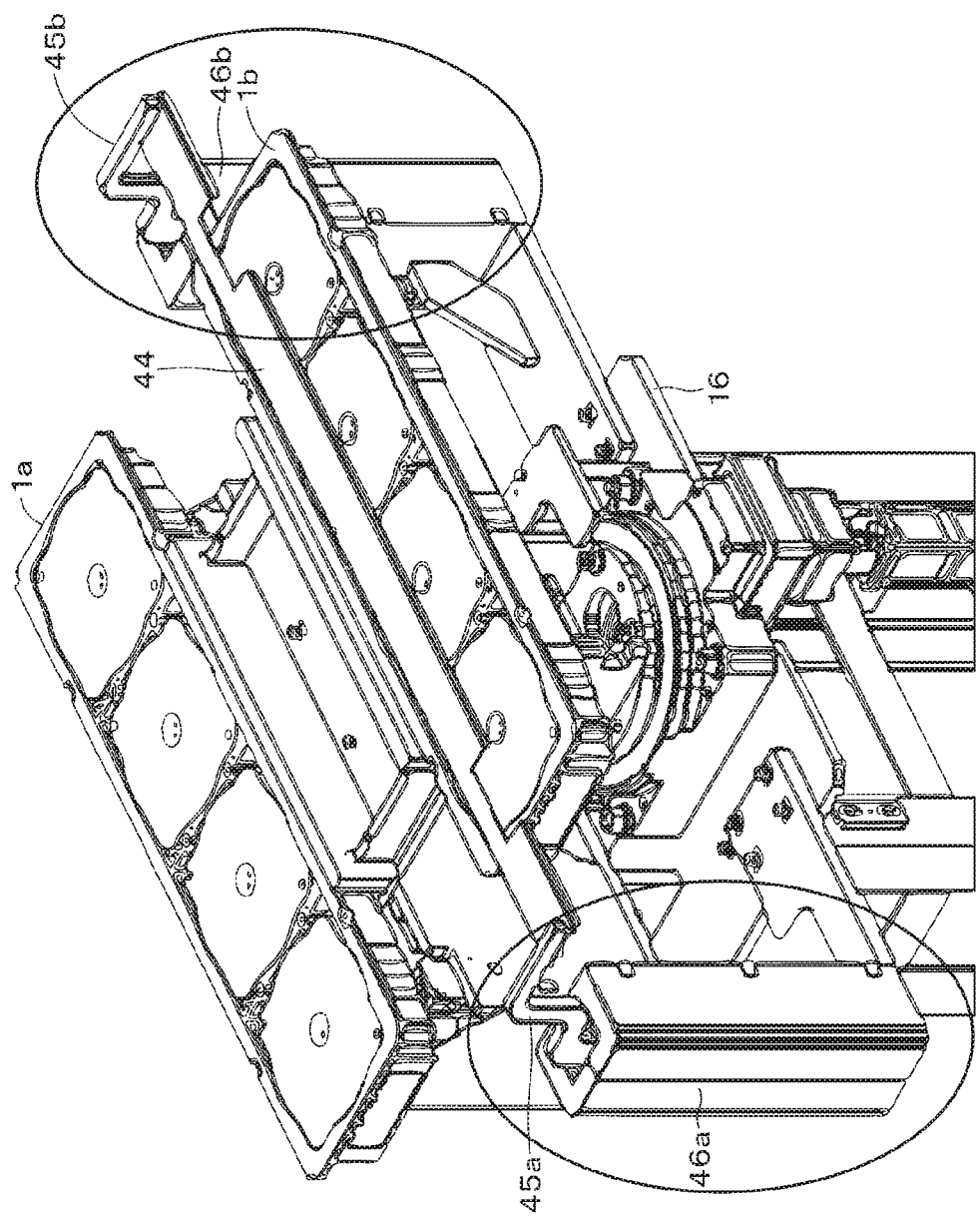
FIG. 17 is a perspective view used to describe a turntable.
Figure 18:
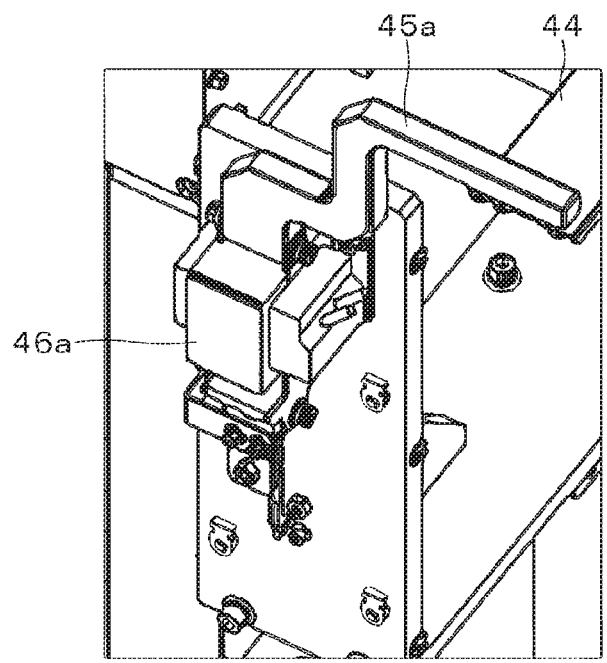
FIG. 18 is a perspective view illustrating a part of the turntable.

FIG. 17 is a perspective view of a part of the turntable 16, and FIG. 18 illustrates an enlarged view of an encircled portion of FIG. 17. In FIG. 18, a casing outside a solenoid actuator 46a is removed. As described above, the turntable 16 is rotatable, the disc tray 1a on the first area of the turntable 16 is a target of the processing including recording or reproducing, and the selected next disc tray 1b is placed above the second area of the turntable 16. A roof-like stopper 44 is provided in the second area where delivery of the disc tray is performed with the tray conveyance robot 12.

The stopper 44 is a plate-like member slightly longer than a length in a longitudinal length of the disc tray 1b, and both ends thereof are supported by arms 45a and 45b. The arms 45a and 45b are connected to a drive shaft of the solenoid actuator 46a and a drive shaft of a solenoid actuator 46b respectively, and the stopper 44 is moved up and down by the solenoids 46a and 46b. At a position where the stopper 44 is lowered, a gap is formed between a lower surface of the stopper 44 and the upper surface of the disc tray 1. The gap is shorter than the length of each of the leg portions 9.

Since the stopper 44 is provided, the disc cover 7 and the discs 5 can be prevented from popping out. Furthermore, the disc tray 1 can be prevented from popping out from the turntable 16. Note that a reason why the stoppers 44 is moved up and down by the solenoids 46a and 46b is to prevent collision with the disc tray 1 on the tray conveyance robot 12 when the turntable 16 receives the disc tray 1.

Figure 19:
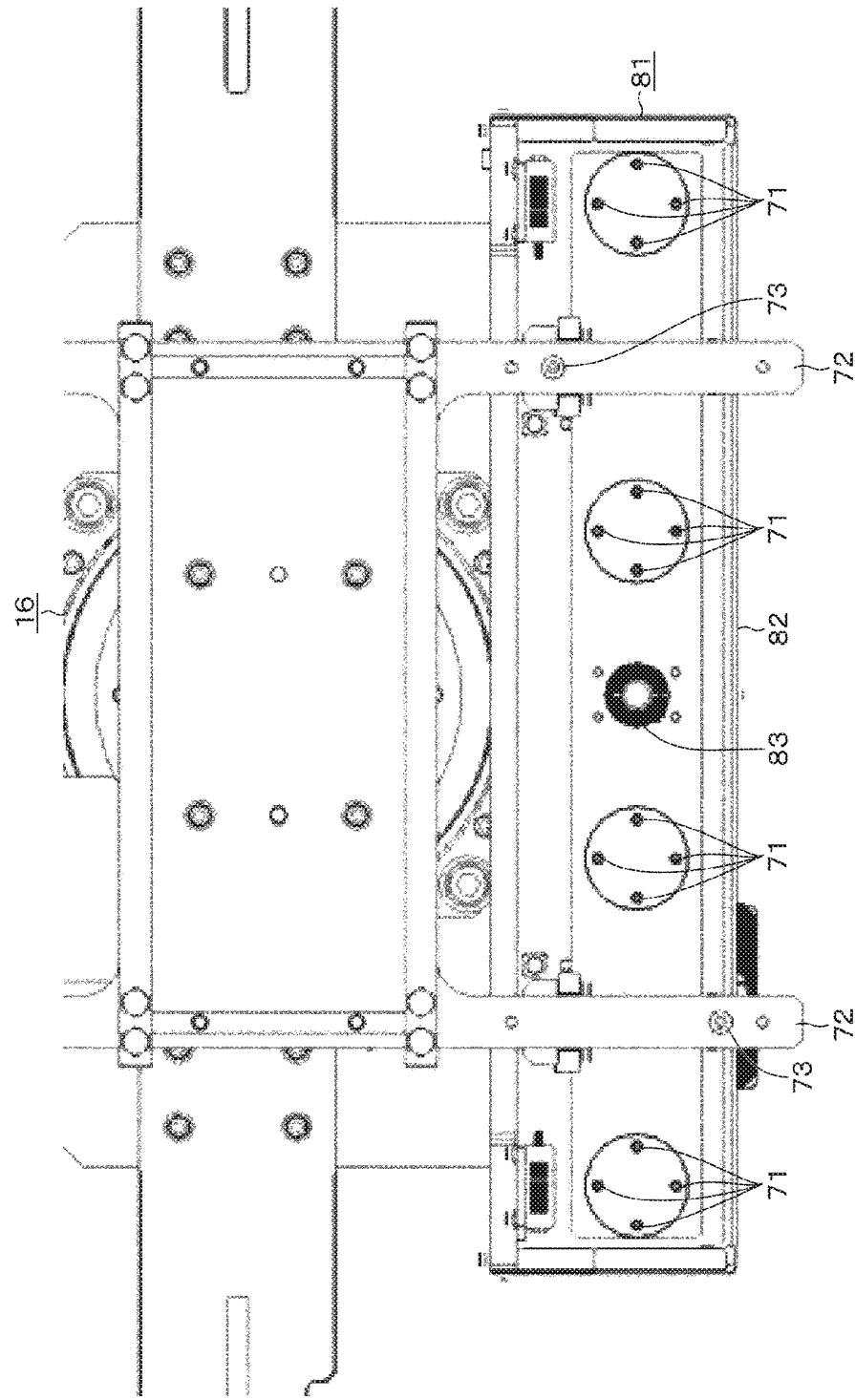
FIG. 19 is a plan view of a part of the turntable.
Figure 20:
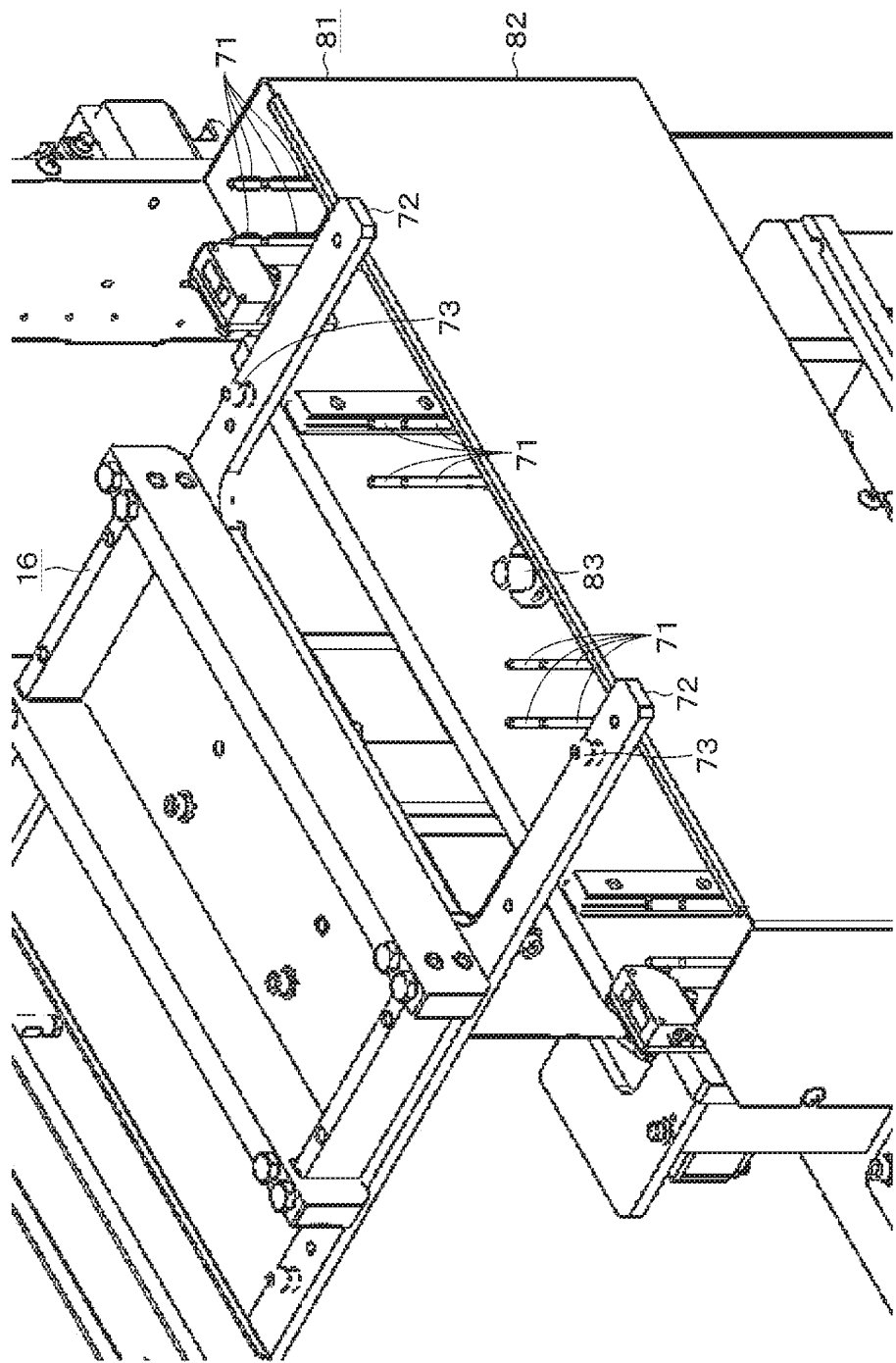
FIG. 20 is a perspective view illustrating a part of the turntable.
Figure 21:
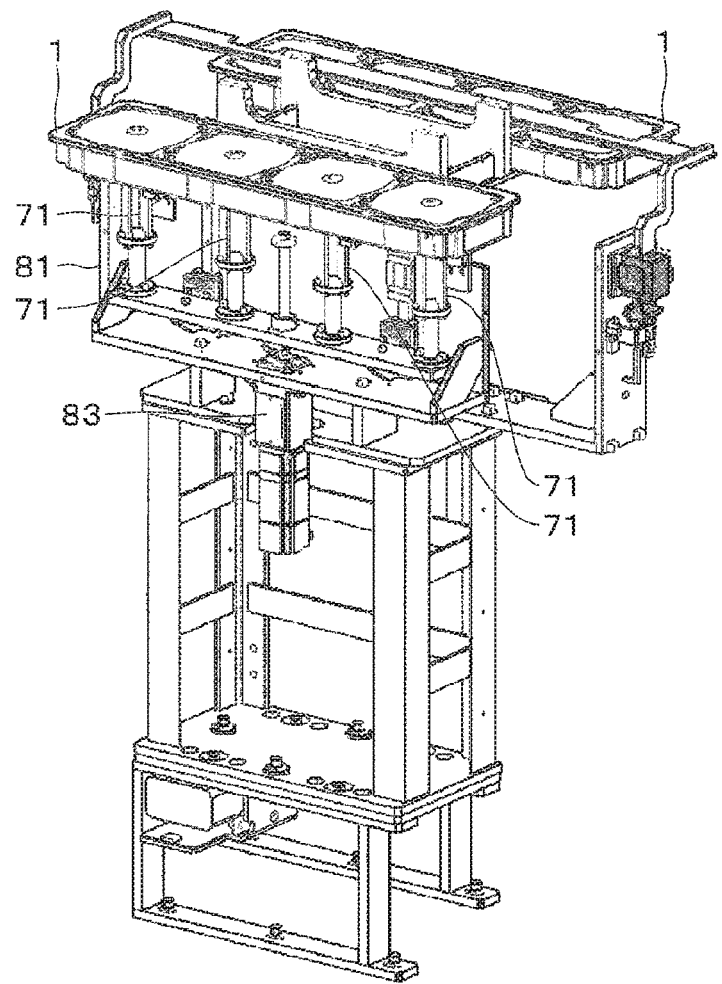
FIG. 21 is a perspective view illustrating a part of the turntable.

The turntable 16 will be further described with reference to FIGS. 19 to 22. FIGS. 19 and 20 are respectively a plan view and a perspective view of a part of the turntable 16 when the disc tray 1 is removed. The turntable 16 is provided with a tray placement unit including two parallel support arms 72. In each of the support arms 72, a position restricting pin 73 to be fitted into a hole provided on the bottom surface of the disc tray 1 is made to protrude, and stably holds the disc tray 1 placed as illustrated in FIG. 21.

Figure 22:
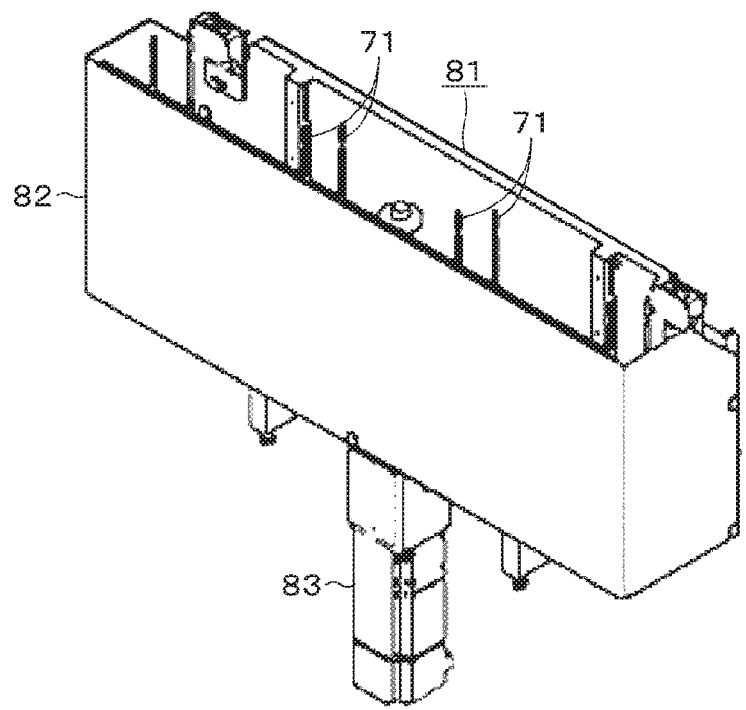
FIG. 22 is a perspective view illustrating a part of the turntable.

A disc push-out pusher 81 is provided below each of the support arms 72 functioning as the tray placement unit. The disc push-out pusher 81 is installed on an inner side of a cover 82. FIG. 21 is a perspective view illustrating a state in which the cover 82 is removed. Additionally, FIG. 22 is a perspective view illustrating the disc push-out pusher 81 alone. The disc push-out pusher 81 is movable up and down by an actuator 83. Note that the disc push-out pusher 81 is used in a case of picking out the discs by the disc conveyance picker 15, and therefore, even though the turntable 16 including the two tray placement units, the disc push-out pusher 81 is provided only for one tray placement unit.

The disc push-out pusher 81 includes the pins 71 to be inserted into the disc tray 1 through the through holes 61 of the bottom plate of the disc tray 1 placed on the support arms 72. In other words, as described above with reference to FIGS. 12A and 12B, the pins 71 of the disc push-out pusher push up the spacer 51 and the discs 5 in the disc tray 1 from the lower side through the through holes 61.

[Feeding Discs to Drive]

Next, a pusher (hereinafter referred to as drive feeding pusher) used in a case of loading discs 5 conveyed by the disc conveyance picker 15 on a drive tray 13a of the drive 13 will be described with reference to FIGS. 23, 24, 25A, 25B, and 25C.

The disc conveyance picker 15 picks out a plurality of stacked discs 5 from the disc tray 1, supports the plurality of discs 5, and further conveys the plurality of discs 5 to a position near the drive 13. The drive feeding pusher separates one disc and places the one disc on the drive tray 13a in cooperation with the disc conveyance picker 15. As described later, the disc conveyance picker 15 includes: a plurality of claws provided at the same height positions to support/separate each disc 5; a picker driving unit 15a including a plunger and a drive source such as a motor; and a picker mechanism 15b to move the claws.

The drive tray 13a of the disc drive 13 is ejected, and the plurality of discs 5 held by the disc conveyance picker 15 is located above (for example, immediately above) the drive tray 13a. In this state, the disc conveyance picker 15 is operated to move down the picker pusher on which a lowermost disc 5 is loaded on the picker pusher, and the disc 5 is placed on the drive tray 13a.

Figure 23:
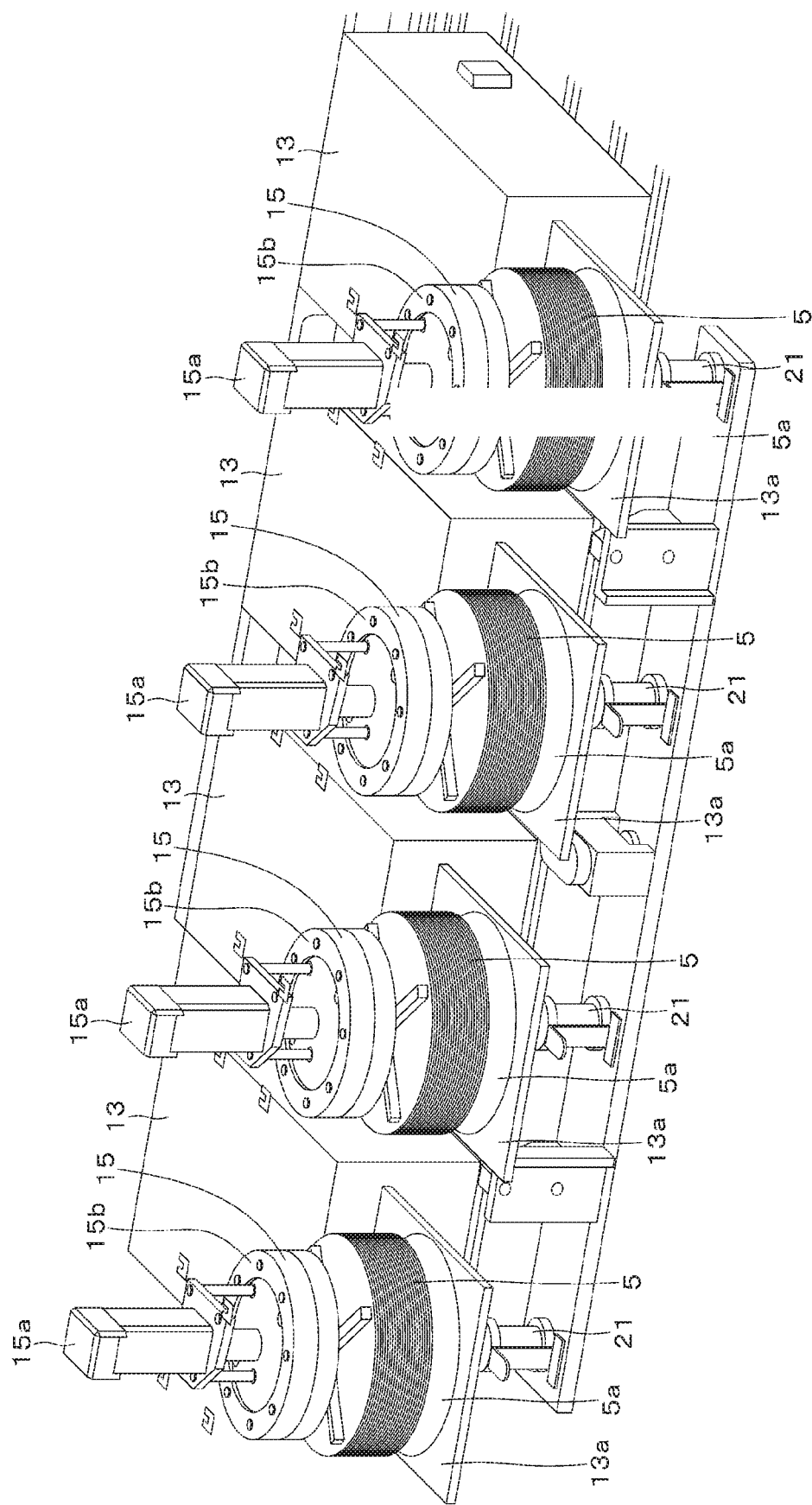
FIG. 23 is a perspective view used to describe a disc conveyance picker.
Figure 24:
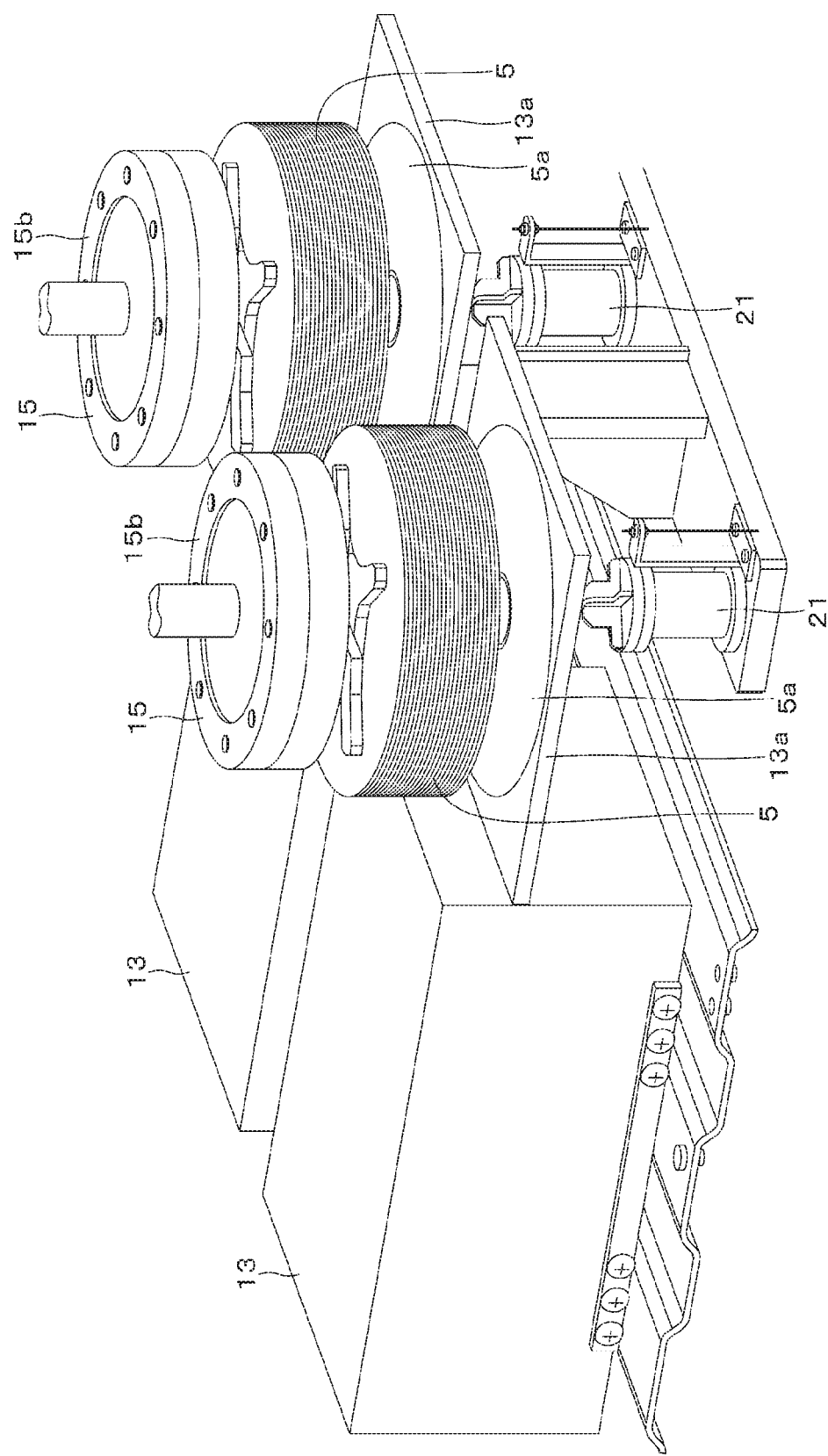
FIG. 24 is a perspective view used to describe the disc conveyance picker.

FIGS. 23 and 24 illustrate a state in which a disc 5a is placed above the drive trays 13a. Note that the discs placed above the drive tray 13a is referred to as discs 5a in order to distinguish these discs from other discs. The drive feeding pusher includes a picker pusher that has a center coinciding with a center of the disc conveyance picker 15 and is movable up and down. A pusher 22 (see FIG. 25A) is provided at a tip of the picker pusher. Note that a line connecting the center of the disc conveyance picker 15 to the center of the picker pusher is designed to pass through a center of a center hole of the drive tray 13a when the disc 5 is placed on the drive tray 13a.

Figure 25A:
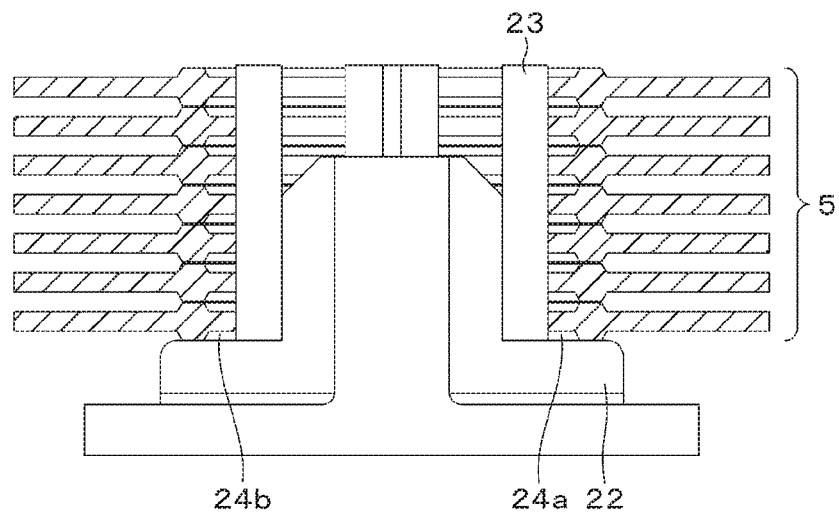
FIGS. 25A, 25B and 25C are cross-sectional views used to describe a picker pusher.
Figure 25B:
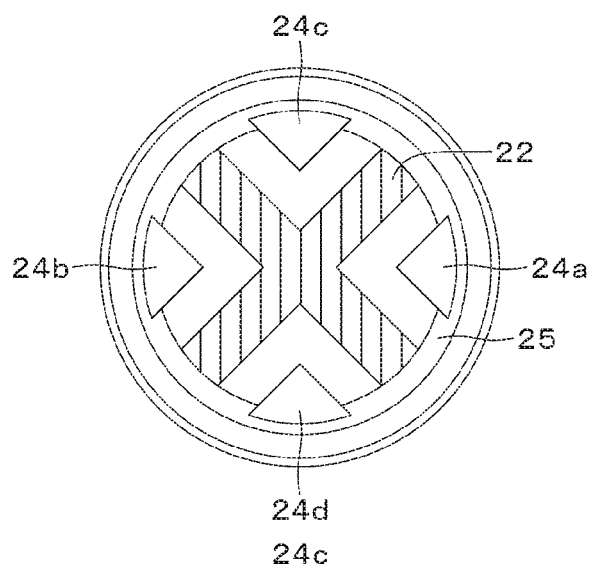
Figure 25C:
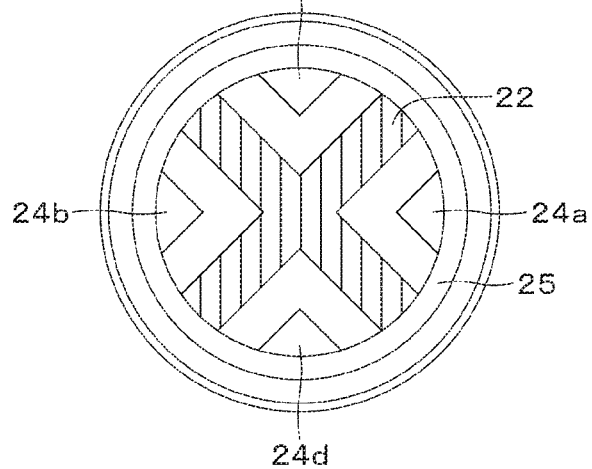

As illustrated in FIGS. 25B and 25C, the pusher 22 at the tip of the picker pusher includes plate-shaped protrusions intersecting with each other like a cross shape, and includes a tapered portion at a tip of each of the plate-shaped protrusions. In a case where the pusher 22 is inserted into a center hole of a picker finger 23 of the disc conveyance picker 15, the tapered portion functions as a guide at the time of insertion.

The picker finger 23 of the disc conveyance picker 15 has a cylindrical shape having an outer diameter slightly smaller than a diameter of the central hole of the disc 5, and includes four claws 24a, 24b, 24c, and 24d (referred to as claws 24 in a case where there is no need to distinguish the individual claws) that can protrude or be retracted at a position of a height same as an outer peripheral surface of the picker finger 23. The claws 24 are operated by the picker driving unit 15a and the picker mechanism 15b located above. Note that the number of claws 24 may be the number other than four.

FIGS. 25A and 25B illustrate a state in which the claws 24 protrude to the outside of the picker finger 23 (hereinafter referred to as an open state). In this state, for example, the claws 24 contact a non-signal area (referred to as a clamping area) inside the lowermost disc 5 among the held discs 5. Therefore, the plurality of discs 5 in the stacked state is supported by the claws 24.

FIG. 25C illustrates a state in which the claw 24 is retracted to the inside of the picker finger 23 (hereinafter referred to as a closed state). In this state, the discs 5 are not supported by the claws 24. A separated disc 5 is supported in a manner abutting on a flange portion of the pusher 22 located below. In this case, the claws 24 are deemed as an open state at a position between the lowermost disc 5 and another disc 5 located one stage higher. Therefore, only the lowermost disc 5 is separate by moving down the pusher 22, and the disc 5 separated by the pusher 22 is supported.

As described above, the pusher 22 of the picker pusher is inserted into the central hole of the picker finger 23. A difference between the outer diameter of the pusher 22 and an inner diameter of the central hole of the picker finger 23 is made small to reduce a gap between both components. Since the pusher 22 is provided, the disc 5 can be prevented from being displaced sideways when the claws 24 are operated. Therefore, it is possible to prevent a plurality of discs from being displaced and falling off from the claws 24 on the way of the disc conveyance picker 15 conveying the discs stacked in manner laterally displaced. Furthermore, since the four claws 24 positioned at the same height position are operated synchronously, opening and closing of the claws can be more easily controlled compared to a case where two kinds of claws are provided at different height positions and the two kinds of claws are operated differently.

[Disc Pick-Out Operation by Disc Conveyance Picker]

The discs 5 fed to the drive 13 described above is those picked out from the disc tray 1 on the turntable 16 by the disc conveyance picker 15. Hereinafter, disc pick-out operation from the disc tray will be described with reference to FIGS. 26, 27 and 28. A tip end of the picker finger 23 as a disc support portion of the disc conveyance picker 15 abuts on a tip of each center pole 4. With this abutment, the stacked body is held even when the stacked body of discs 5 is pushed out above the disc tray 1.

Figure 26:
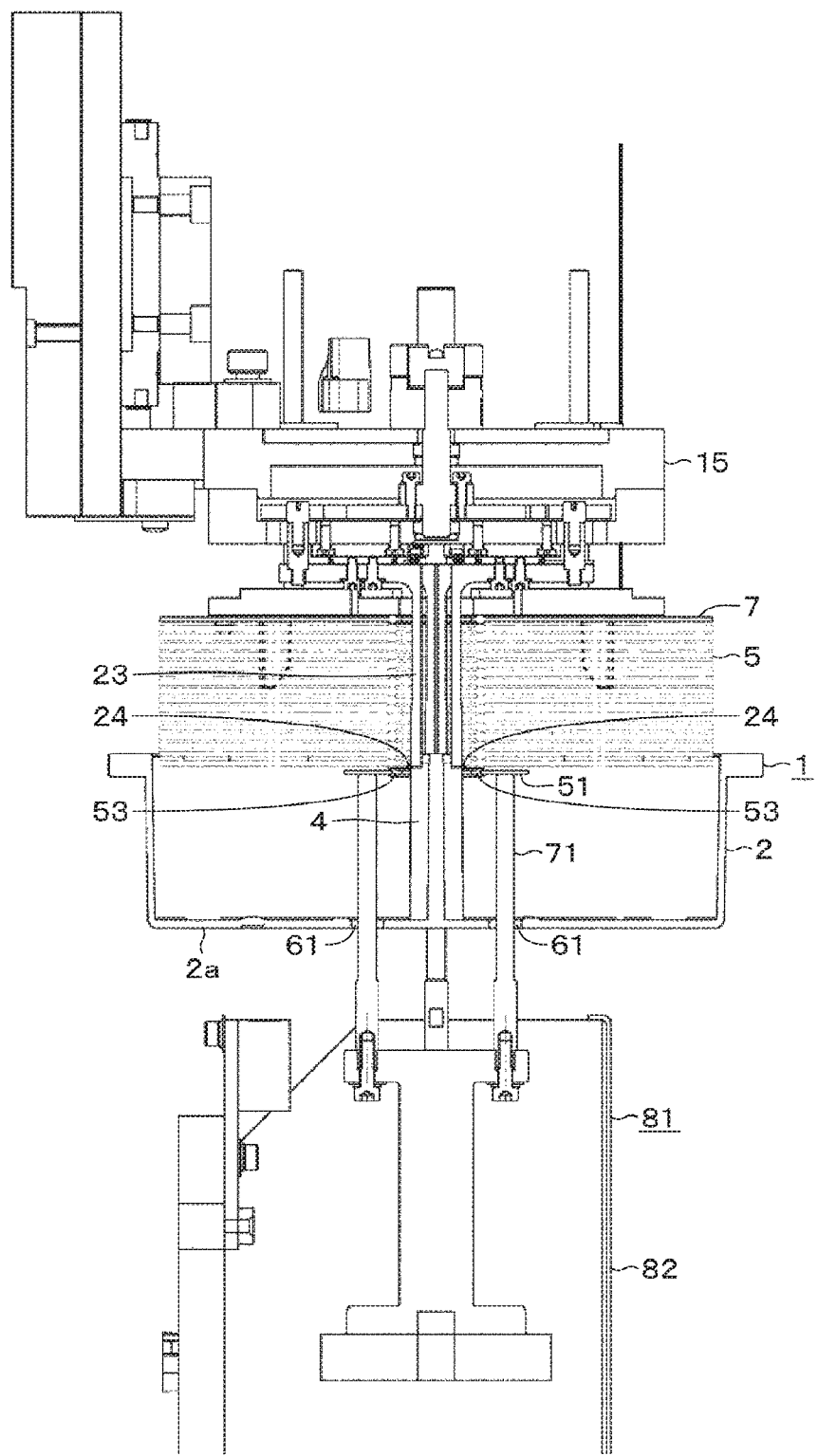
FIG. 26 is a cross-sectional view illustrating a configuration to pick out each disc from the disc tray by the disc push-out pusher and the disc conveyance picker.
Figure 27:
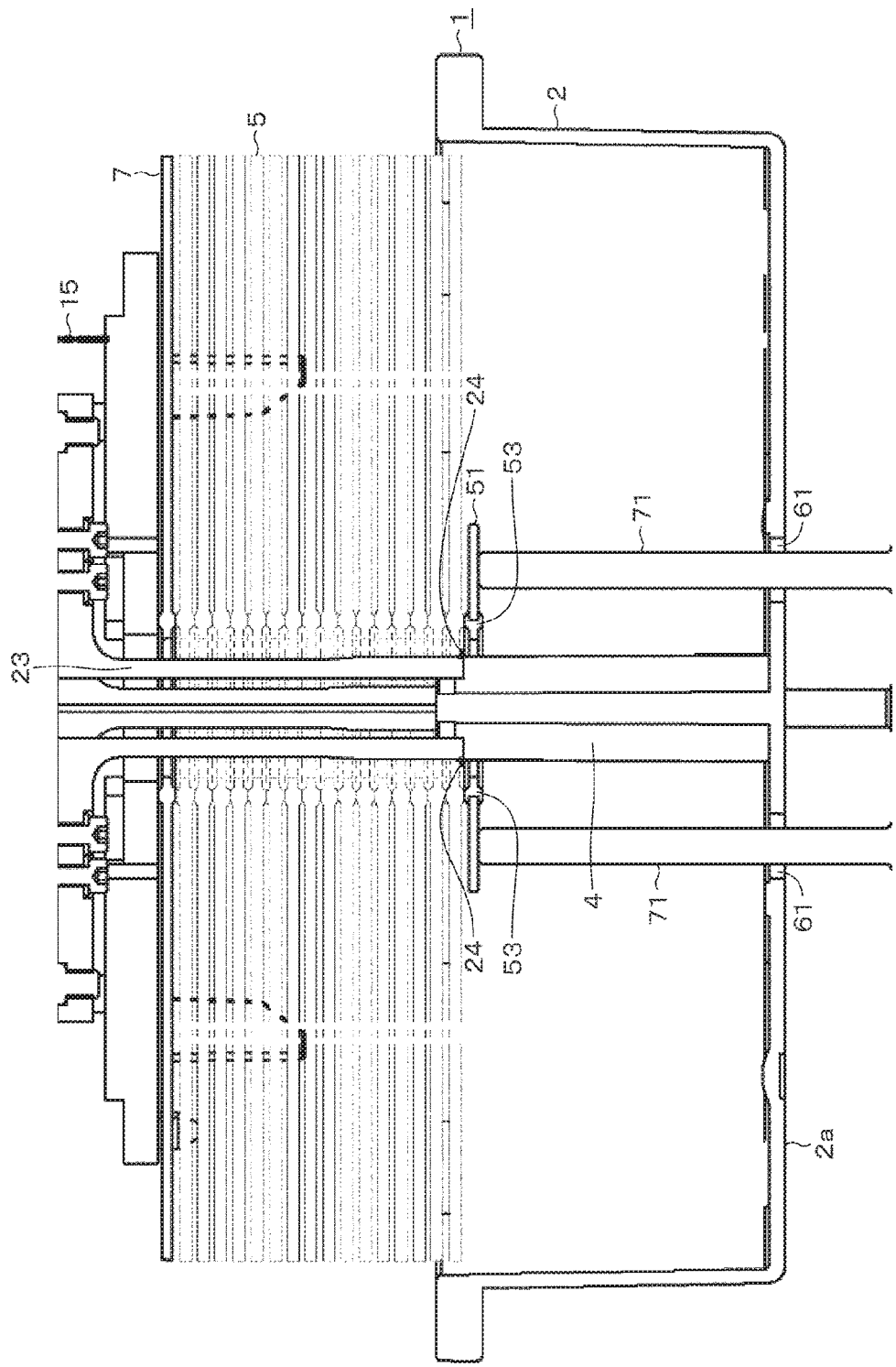
FIG. 27 is a partially enlarged view of FIG. 26.
Figure 28:
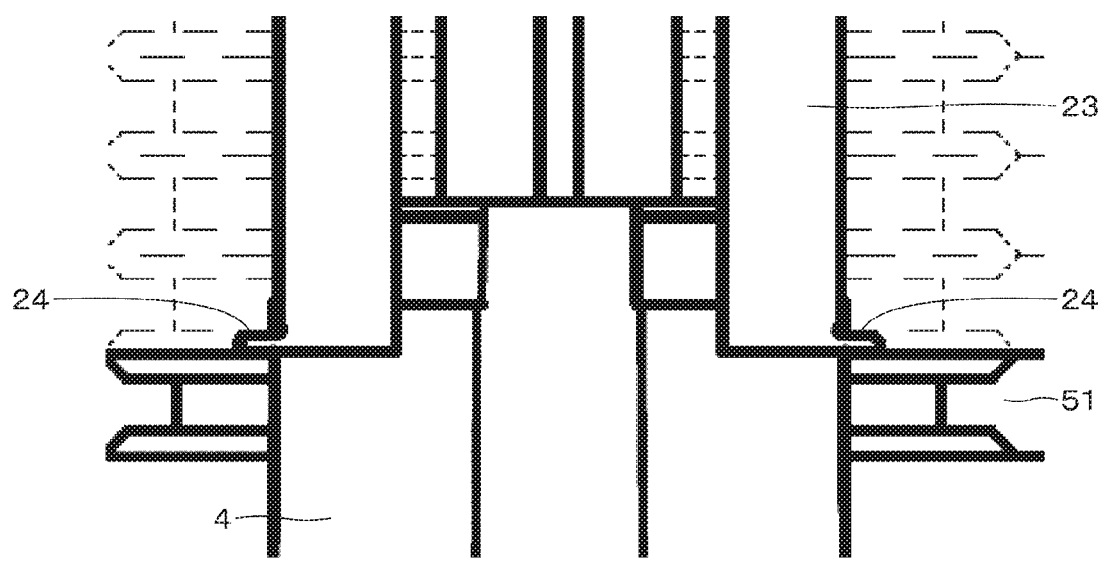
FIG. 28 is a partially enlarged view of FIG. 27.

As illustrated in FIG. 26, the disc push-out pusher 81 is positioned below the disc tray 1. When the disc pick-out operation is started, the disc push-out pusher 81 is moved up by the actuator 83, the pins 71 are inserted into the disc tray 1 through the through holes 61, and the spacer 51 abuts on the tips of the pins 71. Note that the four rows of the disc stacked portions are included inside the disc tray 1, and the four pins 71 are provided for each row. FIGS. 26 to 28 illustrate only one row of the disc stacked portion for simplification.

The pins 71 are further moved up to push up the spacer 51 and the stacked body of the discs 5. The stacked body is moved up by being guided by the center pole 4 of the disc tray 1 and the picker finger 23. In the example illustrated in the drawings, pick-out for all of the discs is started from the lowermost disc in the stacked body. In this case, the stacked body is moved up to a position where the lowermost disc pops out from the upper surface of the casing 2 of the disc tray 1.

When the stacked body is moved up to the predetermined position, the claws 24 become a state opened from the picker finger 23 of the disc conveyance picker 15 as illustrated in an enlarged manner in FIGS. 27 and 28. The claws 24 are opened between the upper surface of the spacer 51 and the clamping area of the lowermost disc 5.

Next, the disc push-out pushers 81 (pins 71) start to be moved down. Since the pins 71 are moved down by the pins 71 being adsorbed to the spacer 51 by magnetic force of the tips of the magnets 71a, the spacer 51 can be surely separated from the disc even when the spacer 51 adheres to the disc 5 by static electricity. Then, the spacer 51 is moved down together with the pins 71. After that, when the pins 71 are further moved down, the spacer 51 that has been adsorbed to the pins 71 is separated, and the pins 71 are taken out from the disc tray 1, but the spacer 51 stays inside the disc tray 1.

As described above, in the embodiment of the present technology, the picker finger 23 as a disc holding portion of the disc conveyance picker 15 and the center pole 4 are made continuous to guide the stacked body of the discs 5, and discs to be picked out can be selected in accordance with a push amount of the pins 71 of the disc push-out pusher 81.

2. Modified Examples

While the embodiment of the present technology is specifically described above, the present technology is not limited to the above-described embodiment, and various kinds of modifications based on the technical idea of the present technology can be made. For example, in the present technology, the disc tray may not include the center pole. It is sufficient to provide a member that regulates an outer peripheral side, instead of the center pole.

Additionally, the configurations, methods, processes, shapes, materials, numerical values, and the like exemplified in the above-described embodiment can be mutually combined without departing from the spirit of the present technology.

Note that the present technology may also adopt the following configurations.

(1)

A disc storage device including:

a casing capable of storing a stacked body including one or a plurality of disc recording media and a spacer interposed between the disc recording media and an inner surface of a bottom plate;

a position regulating unit that regulates a storage position of the stacked body inside the casing; and a plurality of through holes formed in an area of the bottom plate of the casing where the spacer is provided, in which the spacer is adsorbed to tips of pins to be inserted through the through holes.

(2)

The disc storage device recited in (1), in which the position regulating unit is a center pole that is fitted into a central opening of the stacked body.

(3)

The disc storage device in (1) or (2), in which the spacer includes a magnetic metal and is adsorbed to a magnet provided at each tip of the pin.

(4)

The disc storage device recited in any one of (1) to (3), in which a central portion of the spacer includes a resin, and an area on which the pin abuts includes a magnetic metal.

(5)

A disc archive device including: a disc storage device; a disc conveyance unit positioned above the disc storage device; and a disc pushing unit positioned below the disc storage device;

in which the disc storage device includes: a casing capable of storing a stacked body including one or a plurality of disc recording media and a spacer interposed between the disc recording media and an inner surface of a bottom plate; a position regulating unit that regulates a storage position of the stacked body inside the casing; and a plurality of through holes formed in an area of the bottom plate of the casing where the spacing is provided, the disc conveyance unit includes: a support portion inserted into a central opening of the stacked body; and a claw that is provided at a peripheral surface on a tip side of the support portion and is openable/closable, the disc recording medium being locked in a state in which the claw is opened, the disc pushing unit includes: a plurality of pins that is inserted into the casing through the through holes and pushes up the spacer; and an actuator that moves up and down the pins, and the pins push up the stacked body while using the support portion and the center pole as guides, and disc recording media located on an upper side than a position of the claw are made to be positioned outside the casing.

(6)

The disc archive device recited in (5), further including an adsorption portion that adsorbs a tip of the pin inserted through the through hole, and the spacer.

REFERENCE SIGNS LIST

1 Disc tray
2 Casing
5 Disc
6 Film
11 Tray rack
12 Tray conveyance robot
13 Disc drive
13a Drive tray
15 Disc conveyance picker
16 Turntable
22 Dive feeding pusher
24a to 24d Claw
51 Spacer
53 Resin ring
54 Metal plate
61 Through hole
71 Disc push-out pusher
71a Magnet
81 Disc push-out pusher
83 Actuator

The invention claimed is:

1. A disc storage device comprising:
a casing capable of storing a stacked body including one or a plurality of disc recording media and a spacer interposed between the disc recording media and an inner surface of a bottom plate;
a position regulating unit that regulates a storage position of the stacked body inside the casing; and
a plurality of through holes formed in an area of the bottom plate of the casing where the spacer is provided, wherein the spacer is adsorbed to tips of pins to be inserted through the through holes.

2. The disc storage device according to claim 1, wherein the position regulating unit is a center pole that is fitted into a central opening of the stacked body.

3. The disc storage device according to claim 1, wherein the spacer includes a magnetic metal and is adsorbed to a magnet provided at each tip of the pin.

4. The disc storage device according to claim 1, wherein a central portion of the spacer includes a resin, and an area on which the pin abuts includes a magnetic metal.

5. A disc archive device comprising: a disc storage device; a disc conveyance unit positioned above the disc storage device; and a disc pushing unit positioned below the disc storage device;
wherein the disc storage device includes: a casing capable of storing a stacked body including one or a plurality of disc recording media and a spacer interposed between the disc recording media and an inner surface of a bottom plate; a position regulating unit that regulates a storage position of the stacked body inside the casing; and a plurality of through holes formed in an area of the bottom plate of the casing where the spacer is provided,
the disc conveyance unit includes: a support portion inserted into a central opening of the stacked body; and a claw that is provided at a peripheral surface on a tip side of the support portion and is openable/closable, the disc recording medium being locked in a state in which the claw is opened,
the disc pushing unit includes: a plurality of pins that is inserted into the casing through the through holes and pushes up the spacer; and an actuator that moves up and down the pins, and
the pins push up the stacked body while using the support portion and the center pole as guides, and disc recording media located on an upper side than a position of the claw are made to be positioned outside the casing.

6. The disc archive device according to claim 5, further comprising an adsorption portion that adsorbs a tip of the pin inserted through the through hole, and the spacer.

* * * * *